United States Patent
Hattori et al.

(10) Patent No.: US 9,224,232 B2
(45) Date of Patent: Dec. 29, 2015

(54) STEREOSCOPIC IMAGE GENERATION DEVICE, STEREOSCOPIC IMAGE DISPLAY DEVICE, STEREOSCOPIC IMAGE ADJUSTMENT METHOD, PROGRAM FOR CAUSING COMPUTER TO EXECUTE STEREOSCOPIC IMAGE ADJUSTMENT METHOD, AND RECORDING MEDIUM ON WHICH THE PROGRAM IS RECORDED

(75) Inventors: Hisao Hattori, Osaka (JP); Ken-ichiro Yamamoto, Osaka (JP); Hisao Kumai, Osaka (JP); Ikuko Tsubaki, Osaka (JP); Mikio Seto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 334 days.

(21) Appl. No.: 13/823,509

(22) PCT Filed: Sep. 12, 2011

(86) PCT No.: PCT/JP2011/070724
§ 371 (c)(1),
(2), (4) Date: Mar. 14, 2013

(87) PCT Pub. No.: WO2012/036120
PCT Pub. Date: Mar. 22, 2012

(65) Prior Publication Data
US 2013/0169633 A1 Jul. 4, 2013

(30) Foreign Application Priority Data

Sep. 15, 2010 (JP) ................................. 2010-206318

(51) Int. Cl.
*G06T 15/00* (2011.01)
*H04N 13/04* (2006.01)
*H04N 13/00* (2006.01)

(52) U.S. Cl.
CPC .......... *G06T 15/005* (2013.01); *H04N 13/0022* (2013.01)

(58) Field of Classification Search
CPC ......................... G06T 15/005; H04N 13/0022
See application file for complete search history.

(56) References Cited

U.S. PATENT DOCUMENTS 6,985,619 B1 * 1/2006 Seta et al. ..................... 382/154
2009/0142041 A1 6/2009 Nagasawa et al.
(Continued)

FOREIGN PATENT DOCUMENTS

| EP | 1168852 A1 | 1/2002 |
| JP | 8-317429 A | 11/1996 |

(Continued)

OTHER PUBLICATIONS
International Search Report mailed on Dec. 6, 2011, issued in PCT/JP2011/070724.
(Continued)

*Primary Examiner* — Sing-Wai Wu
(74) *Attorney, Agent, or Firm* — Birch, Stewart, Kolasch, & Birch, LLP.

(57) ABSTRACT

A stereoscopic image generation device that generates a stereoscopic image including a right-eye image and a left-eye image is provided. The stereoscopic image generation device includes an image enlarging/reducing unit that enlarges or reduces the right-eye image and the left-eye image which constitute stereoscopic image data, and a display control unit that performs control to display a stereoscopic image by showing the right-eye image and the left-eye image of the stereoscopic image data for a right eye and a left eye, respectively. The image enlarging/reducing unit enlarges or reduces the right-eye image and the left-eye image on the basis of parallax amount adjustment information, which includes a position of a right-eye-image reference point and a position of a left-eye-image reference point which are respectively provided at different positions for the right-eye image and the left-eye image, and enlargement ratios of the right-eye image and the left-eye image, with reference to the right-eye-image reference point and the left-eye-image reference point. Accordingly, a position in the depth direction can be easily controlled while adjusting a parallax.

5 Claims, 15 Drawing Sheets

(56) References Cited

U.S. PATENT DOCUMENTS

2011/0018969 A1* 1/2011 Tanaka ............................ 348/47
2011/0069153 A1   3/2011 Nakane
2012/0050502 A1* 3/2012 Chi et al. ........................ 348/51

FOREIGN PATENT DOCUMENTS

| JP | 9-121370 A | 5/1997 |
|---|---|---|
| JP | 2003-52058 A | 2/2003 |
| JP | 2005-73013 A | 3/2005 |
| JP | 2009-135686 A | 6/2009 |
| WO | WO 2010/013382 A1 | 2/2010 |
| WO | WO 2010/092823 A1 | 8/2010 |

OTHER PUBLICATIONS

PCT/ISA/237—mailed on Dec. 6, 2011, issued in PCT/JP2011/070724.

* cited by examiner

FIG. 8
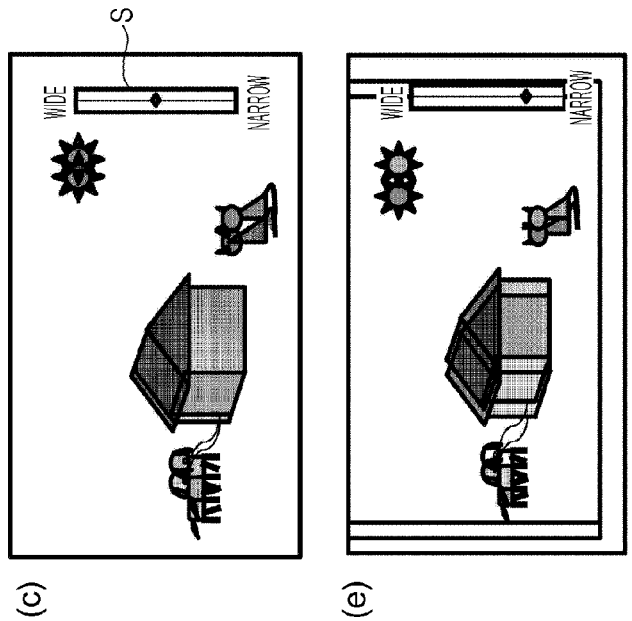
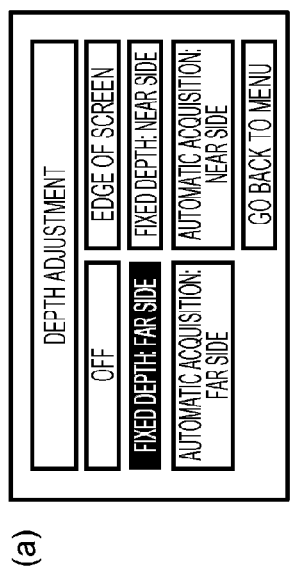
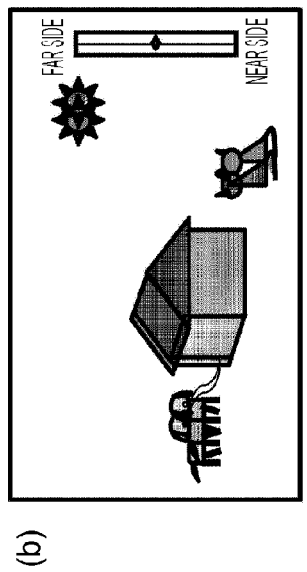
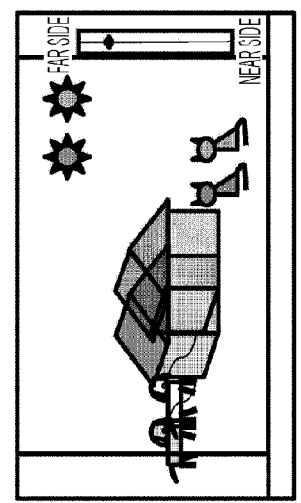

FIG. 10
(a)
EDGE OF SCREEN 1
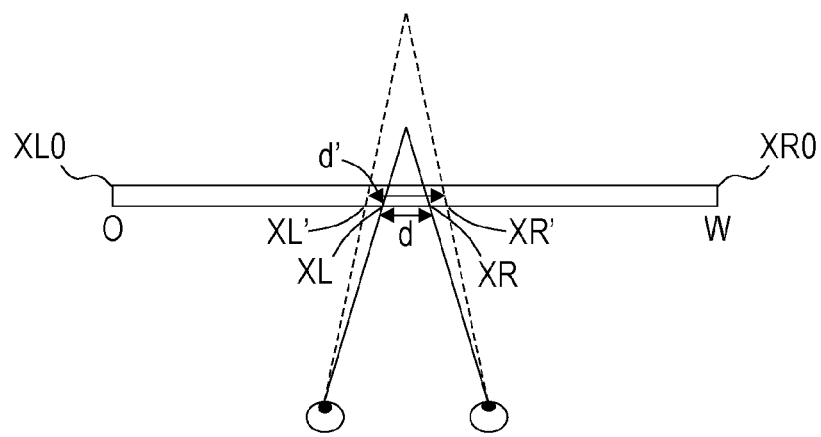
(b)
EDGE OF SCREEN 2
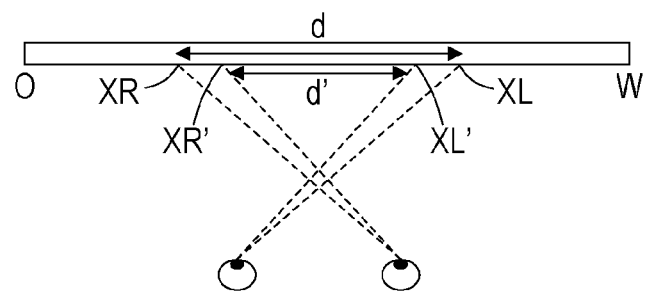

FIG. 11
(a) FIXED DEPTH (FAR SIDE)
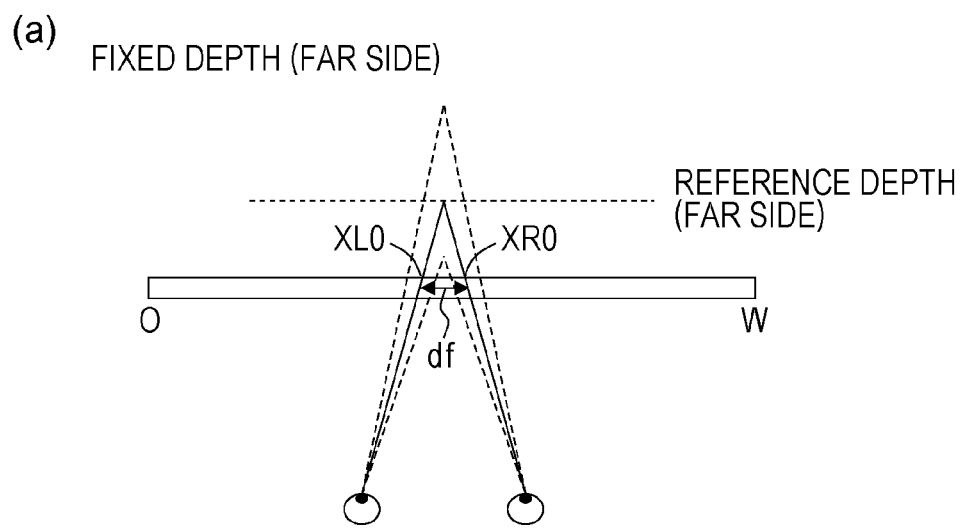
(b) FIXED DEPTH (NEAR SIDE)
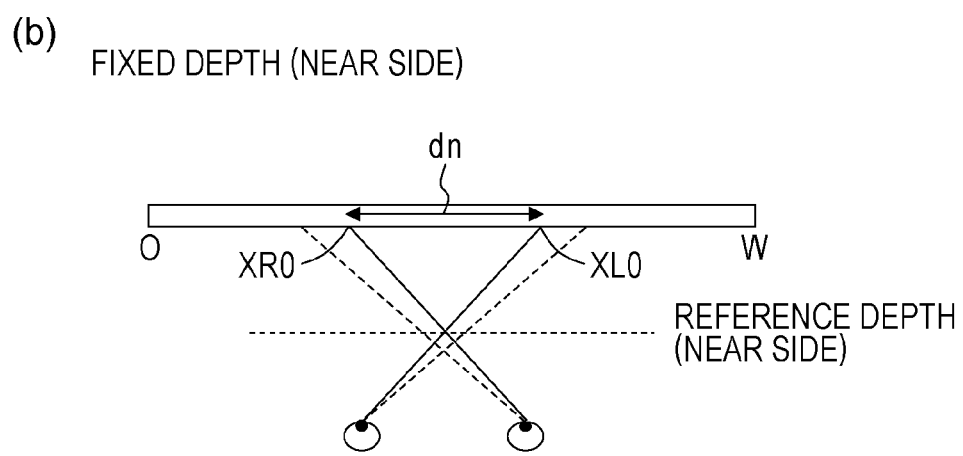

FIG. 12
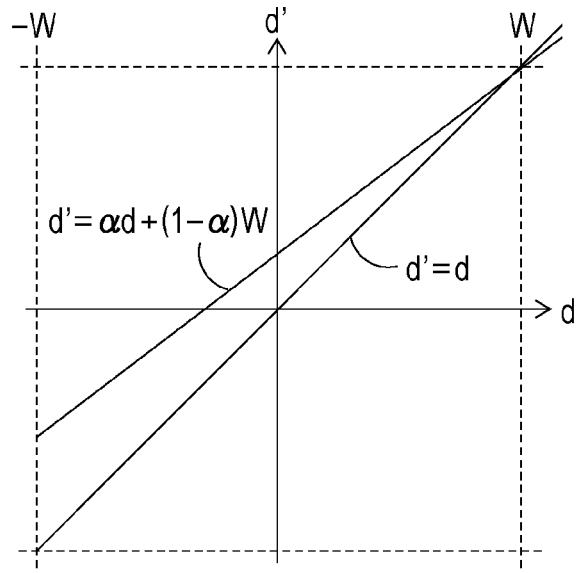
(a) LEFT-EYE IMAGE: REFERENCE IS AT LEFT EDGE
RIGHT-EYE IMAGE: REFERENCE IS AT RIGHT EDGE
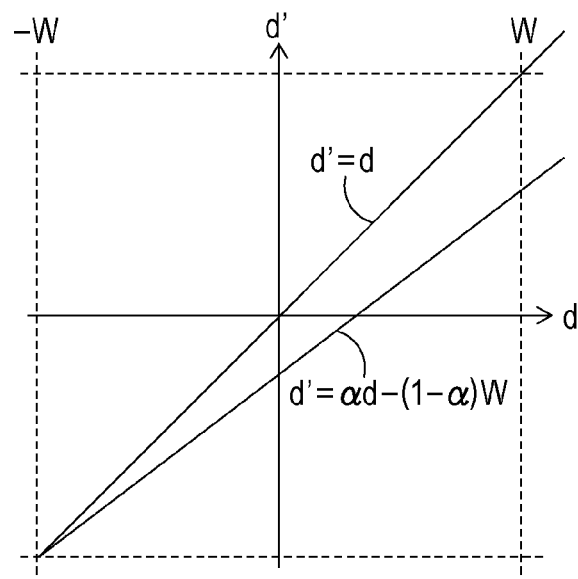
(b) LEFT-EYE IMAGE: REFERENCE IS AT RIGHT EDGE
RIGHT-EYE IMAGE: REFERENCE IS AT LEFT EDGE

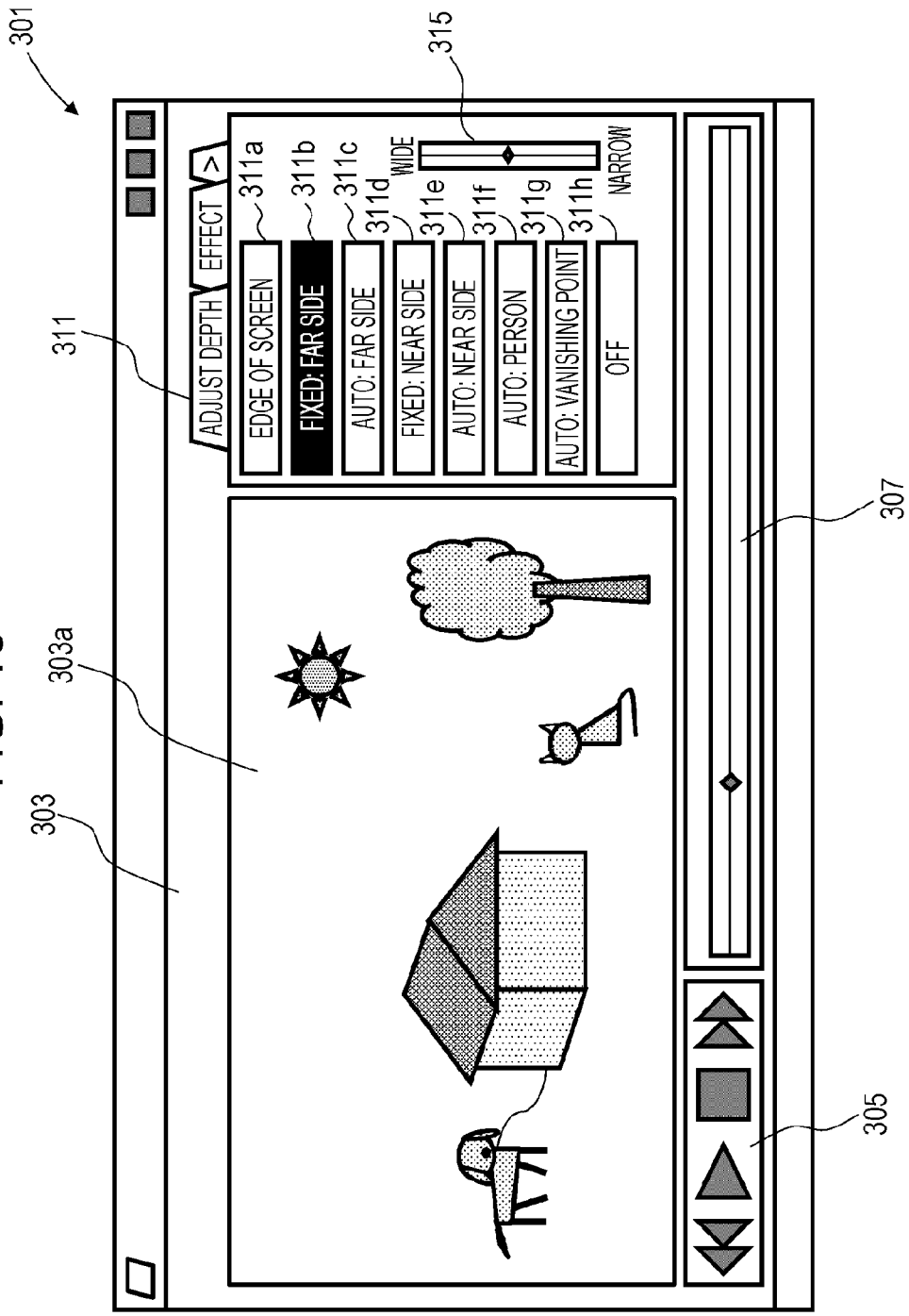

STEREOSCOPIC IMAGE GENERATION DEVICE, STEREOSCOPIC IMAGE DISPLAY DEVICE, STEREOSCOPIC IMAGE ADJUSTMENT METHOD, PROGRAM FOR CAUSING COMPUTER TO EXECUTE STEREOSCOPIC IMAGE ADJUSTMENT METHOD, AND RECORDING MEDIUM ON WHICH THE PROGRAM IS RECORDED

TECHNICAL FIELD

The present invention relates to a stereoscopic image generation device that generates a stereoscopic image, and particularly relates to an adjustment method for adjusting a stereoscopic effect of a stereoscopic image, a program for adjusting a stereoscopic effect of a stereoscopic image, and a computer-readable recording medium on which the program is recorded.

BACKGROUND ART

Humans have the ability to recognize a space on the basis of a difference between images which are perceived by two eyes located at a certain distance from each other. A difference between corresponding points in images which are obtained from the different viewpoints of the left eye and right eye is called a parallax, and humans stereoscopically recognize the positional relationship among target objects by using a parallax as a clue. It is known that, by utilizing this theory, stereoscopic viewing can be achieved by providing means for displaying a right-eye image for a right eye and a left-eye image for a left eye, and by displaying the right-eye image and the left-eye image having a parallax. Here, a plurality of images having a parallax for stereoscopic viewing are referred to as "stereoscopic images".

It is said that, in stereoscopic viewing, a human associates an angle formed between optical axes of both eyes corresponding to a parallax, that is, the degree of convergence, with a distance to a target object. Thus, if a right-eye image is relatively displaced to the right and a left-eye image is relatively displaced to the left so as to show images with a parallax, the viewer can perceive a displayed object at a point located behind an actual display surface. At this time, however, if the parallax is too large, for example, if the parallax is larger than the distance between the eyes of the viewer, more precisely, if the parallax is larger than the distance between pupils at the time when the viewer is viewing a point at infinity, a state which is impossible in nature will occur, and stereoscopic viewing is not achieved. Also in the short-distance side, an extreme parallax causes an unnatural positional relationship, makes the viewer extremely cross-eyed, and inhibits comfortable stereoscopic viewing. In this way, comfortable stereoscopic viewing can be achieved if the parallax of a stereoscopic image is within a certain range. However, if the absolute value of the parallax increases, images for both eyes are not fused and stereoscopic viewing is not achieved.

PTL 1 discloses a method for adjusting a parallax by displacing the display positions of left and right images to the left and right and displaying a stereoscopic image in a viewer-friendly manner, in the case of displaying a stereoscopic image having an excessively large parallax amount which makes it difficult or impossible to achieve stereoscopic viewing.

According to this method, parallax adjustment is performed by displacing the display positions of left and right images, the depth positions of all displayed objects are moved in the forward or backward direction, and thereby fusion of the displayed objects can be promoted. However, displacing the display positions of left and right images may generate, at the edges of displayed images, a region which cannot be displayed, and a part of an image region is lost. In the lost part, the left and right images are not paired, and stereoscopic viewing is not achieved. That is, a region where stereoscopic display is not achieved is generated. Furthermore, if an excessive parallax is given both on the far side and near side in the depth direction, difficulty in fusing images is not overcome even if depth positions are overall moved forward or backward.

PTL 2 discloses a display method for adjusting a parallax amount by enlarging or reducing left and right images, thereby enabling stereoscopic viewing of an entire screen. According to this method, the parallax of the entire screen can be reduced while stereoscopically viewing the entire screen, and images which are easily fused can be obtained.

CITATION LIST

Patent Literature

PTL 1: Japanese Unexamined Patent Application Publication No. 09-121370

PTL 2: Japanese Unexamined Patent Application Publication No. 2005-73013

SUMMARY OF INVENTION

Technical Problem

However, according to the method disclosed in PTL 2, all depth positions can be made closer to the position of a display surface, but PTL 2 does not refer to control of depth positions.

An object of the present invention is to provide a stereoscopic image generation technology in which positions in the depth direction are easily controlled while parallax adjustment being performed.

Solution to Problem

According to an aspect of the present invention, there is provided a stereoscopic image generation device that displays a stereoscopic image including a right-eye image and a left-eye image and that generates a stereoscopic image by showing the right-eye image for a right eye and the left-eye image for a left eye. The stereoscopic image generation device includes an image enlarging/reducing unit that enlarges or reduces the right-eye image and the left-eye image which constitute stereoscopic image data, and a display control unit that performs control to display a stereoscopic image by showing the right-eye image and the left-eye image of the stereoscopic image data for the right eye and the left eye, respectively. The image enlarging/reducing unit enlarges or reduces the right-eye image and the left-eye image on the basis of parallax amount adjustment information, which includes a position of a right-eye-image reference point and a position of a left-eye-image reference point which are respectively provided at different positions for the right-eye image and the left-eye image, and enlargement ratios of the right-eye image and the left-eye image, with reference to the right-eye-image reference point and the left-eye-image reference point, on the basis of the enlargement ratios.

The image enlarging/reducing unit may enlarge or reduce the right-eye image and the left-eye image only in a lateral direction on the basis of the enlargement ratios with reference to the right-eye-image reference point and the left-eye-image reference point, respectively.

Also, according to the present invention, there is provided a stereoscopic image generation device that displays a stereoscopic image including a right-eye image and a left-eye image and that generates a stereoscopic image by showing the right-eye image for a right eye and the left-eye image for a left eye. The stereoscopic image generation device includes an image enlarging/reducing unit that enlarges or reduces the right-eye image and the left-eye image which constitute stereoscopic image data, and a display control unit that performs control to display a stereoscopic image by showing the right-eye image and the left-eye image of the stereoscopic image data for the right eye and the left eye, respectively. The image enlarging/reducing unit enlarges or reduces the right-eye image and the left-eye image only in a lateral direction on the basis of parallax amount adjustment information, which includes a position of a right-eye-image reference point and a position of a left-eye-image reference point which are respectively provided at different positions for the right-eye image and the left-eye image, and enlargement ratios of the right-eye image and the left-eye image, with reference to the right-eye-image reference point and the left-eye-image reference point, on the basis of the enlargement ratios.

Enlargement or reduction only in the lateral direction prevents generation of a non-display region at the top and bottom of a screen.

Preferably, the positions in the vertical direction of the right-eye-image reference point and the left-eye-image reference point are the same.

The region of the screen can be effectively used by setting the reference points at the left and right edges of the screen.

Preferably, the lateral distance between the right-eye-image reference point and the left-eye-image reference point is set on the basis of a parallax amount which is associated with a reference position in a depth direction, the reference position not changing when a depth position is adjusted by adjusting a parallax amount. Accordingly, depth can be controlled on the basis of a reference depth.

Preferably, the right-eye-image reference point and the left-eye-image reference point are symmetrically located on the right and left with respect to the center point in the lateral direction on the screen. Accordingly, the center is not displaced, and the region of the screen can be effectively used.

The parallax amount adjustment information may be manually set with use of a user input unit with which user input is performed. Accordingly, a value can be set in accordance with preference of a viewer or how much the viewer has become used to a stereoscopic image.

Preferably, the stereoscopic image generation device further includes a parallax amount acquiring unit that acquires a parallax amount from the stereoscopic image data. The parallax amount adjustment information is set on the basis of a parallax amount which has been acquired by analyzing the stereoscopic image data by the parallax amount acquiring unit.

Preferably, a lateral distance between the positions of the right-eye-image reference point and the left-eye-image reference point is set on the basis of a parallax amount which has been acquired by the parallax amount acquiring unit. Accordingly, depth can be naturally controlled.

The lateral distance between the right-eye-image reference point and the left-eye-image reference point may be set on the basis of a parallax of a far-end view acquired by the parallax amount acquiring unit, so that the depth of the far-end view can be fixed. Also, the lateral distance between the right-eye-image reference point and the left-eye-image reference point may be set on the basis of a parallax of a nearest view acquired by the parallax amount acquiring unit, so that the depth of the nearest view can be fixed.

Preferably, the lateral distance between the right-eye-image reference point and the left-eye-image reference point is set on the basis of an intermediate value between a parallax of a far-end view and a parallax of a nearest view acquired by the parallax amount acquiring unit. Accordingly, the center of depth expressed in an image can be fixed.

Preferably, the lateral distance between the right-eye-image reference point and the left-eye-image reference point is set on the basis of a point where the emergence frequency of a parallax amount is high, the point being acquired by the parallax amount acquiring unit. Accordingly, the depth of a point in a large area can be fixed.

Preferably, the lateral distance between the right-eye-image reference point and the left-eye-image reference point is set on the basis of a point where the amount of change in parallax amount is small, the point being acquired by the parallax amount acquiring unit. Accordingly, the depth of a background image can be fixed.

Preferably, the stereoscopic image generation device further includes an image analyzing unit, and the lateral distance between the right-eye-image reference point and the left-eye-image reference point is set on the basis of a position of a vanishing point of an image, the vanishing point being obtained by the image analyzing unit. Accordingly, the depth of the vanishing point can be fixed.

Preferably, the stereoscopic image generation device further includes an image analyzing unit. The image analyzing unit recognizes a specific pattern from at least either of the right-eye image and the left-eye image, and the lateral distance between the right-eye-image reference point and the left-eye-image reference point is set on the basis of a parallax amount which has been acquired by the parallax amount acquiring unit in accordance with a position of the recognized specific pattern on the image. Accordingly, the depth of a specific image can be fixed.

The enlargement ratios may be set on the basis of a parallax amount which has been acquired by the parallax amount acquiring unit.

The enlargement ratios may be set on the basis of a distribution of parallax amounts which have been acquired by the parallax amount acquiring unit. Accordingly, a distribution of parallaxes is determined, and setting is performed in view of the maximum value and minimum value of the parallaxes, that is, the parallax of a far-end view and the parallax of a nearest view.

The enlargement ratios may be set on the basis of a ratio of a difference between a parallax amount of a far-end view which has been acquired by the parallax amount acquiring unit and the parallax amount which is associated with the reference position in the depth direction, to a certain parallax amount. Accordingly, the distance to the far-end view can be adjusted.

The enlargement ratios may be set on the basis of a ratio of a difference between a parallax amount of a nearest view which has been acquired by the parallax amount acquiring unit and the parallax amount which is associated with the reference position in the depth direction, to a certain parallax amount. Accordingly, the maximum amount of pop-up can be adjusted.

The enlargement ratios may be set on the basis of a ratio of a difference between a parallax amount of a far-end view and a parallax amount of a nearest view which have been acquired by the parallax amount acquiring unit, to a certain parallax amount. Accordingly, a parallax range can be adjusted.

Preferably, the enlargement ratios are set on the basis of dispersion of parallax amounts which have been acquired by the parallax amount acquiring unit. Accordingly, an image with high dispersion is detected as an image having a large burden on eyes, the parallax amount is decreased, and thereby a burden on eyes can be reduced. Preferably, the certain parallax amount is set on the basis of an operation performed by a viewer. Also, preferably, the certain parallax amount is set on the basis of an age of a viewer. Accordingly, an influence on young people can be reduced. The certain parallax amount may be set in accordance with a preference of a viewer.

Preferably, the certain parallax amount is set in accordance with a degree of influence on a living body, the degree of influence being obtained through an experiment. Accordingly, an image with a little influence can be generated using a scientific method.

Preferably, the stereoscopic image generation device includes a frame image superimposition display unit that displays, in a superimposition manner, a frame image on a screen region outside the stereoscopic image data, the screen region being generated by performing a reduction process on the stereoscopic image data by the image enlarging/reducing unit. Accordingly, the region of the screen can be effectively used (display of characters). Also, the viewer can easily feel a stereoscopic effect (display of a frame).

Preferably, the image enlarging/reducing unit provides in advance a region for displaying a frame image, in a screen region outside the stereoscopic image data on the basis of parallax amount setting information which has been set using the input unit. Accordingly, the viewer can easily feel a stereoscopic effect (display of a frame).

Preferably, the stereoscopic image generation device further includes a frame image recording unit that stores in advance an image which is to be used as the frame image, and the frame image is read out from the frame image recording unit.

The stereoscopic image generation device may further include a frame image extracting unit that extracts an image which is to be used as a frame image from the stereoscopic image data, and the frame image which is to be used as a frame image may be read out from the stereoscopic image data.

Preferably, the stereoscopic image generation device further includes frame image selecting means for selecting an image which is to be used as a frame image, and the frame image selecting means selects the other image from among a plurality of frame images which have been read out from at least one of the frame image recording means and the frame image extracting means. Accordingly, a frame image to be used can be selected from among a plurality of frame images.

Preferably, the frame image selecting means reads out specification of an image which is to be used as a frame image from the stereoscopic image data, and selects the other image. Accordingly, a frame image based on the intension of a producer can be obtained.

Preferably, the frame image selecting means selects a frame image on the basis of brightness information about the stereoscopic image data. As a result of selecting a frame image in accordance with the brightness of the screen, matching between the screen and frame can be achieved.

Preferably, the frame image selecting means selects a frame image on the basis of a parallax amount which has been acquired by the parallax amount acquiring means. Accordingly, a frame image can be selected in accordance with the parallax amount of the image.

Preferably, the frame image selecting means selects a frame image on the basis of input performed by a viewer. Accordingly, the frame image can be selected. The frame image selecting means may randomly select a frame image to add interest. The frame image selecting means may select a frame image in accordance with the date and time. Accordingly, a sense of the season and interest can be added. Preferably, character information is superimposed on the frame image to generate the other image. Preferably, the character information is a caption. The character information may be data broadcasting. Also, the character information may be time information.

At least coordinates of the right-eye-image reference point and the left-eye-image reference point or a distance between the right-eye-image reference point and the left-eye-image reference point may be added to the stereoscopic image data as a parallax reference value. The stereoscopic image generation device may further include parallax reference value reading means for acquiring a parallax reference value which has been added by the foregoing stereoscopic image generation device, and the parallax reference value reading means may set the right-eye-image reference point and the left-eye-image reference point on the basis of a parallax reference value which has been acquired by analyzing the stereoscopic image data. Accordingly, parallax adjustment can be performed in accordance with the intention of a producer.

The present invention may be a stereoscopic image display device including any one of the above-described stereoscopic image generation device and a display unit that displays a stereoscopic image.

According to another aspect of the present invention, there is provided a stereoscopic image generation method that enables stereoscopic viewing by showing the right-eye image for a right eye and the left-eye image for a left eye. The stereoscopic image generation method includes an image enlarging/reducing step of enlarging or reducing the right-eye image and the left-eye image which constitute stereoscopic image data, and a display control step of performing control to display a stereoscopic image by showing the right-eye image and the left-eye image of the stereoscopic image data for the right eye and the left eye, respectively. The image enlarging/reducing step enlarges or reduces the right-eye image and the left-eye image on the basis of parallax amount adjustment information, which includes a position of a right-eye-image reference point and a position of a left-eye-image reference point which are respectively provided at different positions for the right-eye image and the left-eye image, and enlargement ratios of the right-eye image and the left-eye image, with reference to the right-eye-image reference point and the left-eye-image reference point, on the basis of the enlargement ratios. The present invention may be a program causing a computer to execute the foregoing stereoscopic image generation method, or may be a computer-readable recording medium on which the program is recorded.

The present description includes the content described in the description and/or drawings of Japanese Patent Application No. 2010-206318, from which the present application claims the priority.

Advantageous Effects of Invention

According to the present invention, a left-eye image and a right-eye image are enlarged or reduced with respect to reference points which are respectively provided on the left-eye image and the right-eye image, and thereby the overall parallax can be adjusted while easily controlling a position in a depth direction using a simple method.

Figure 3:
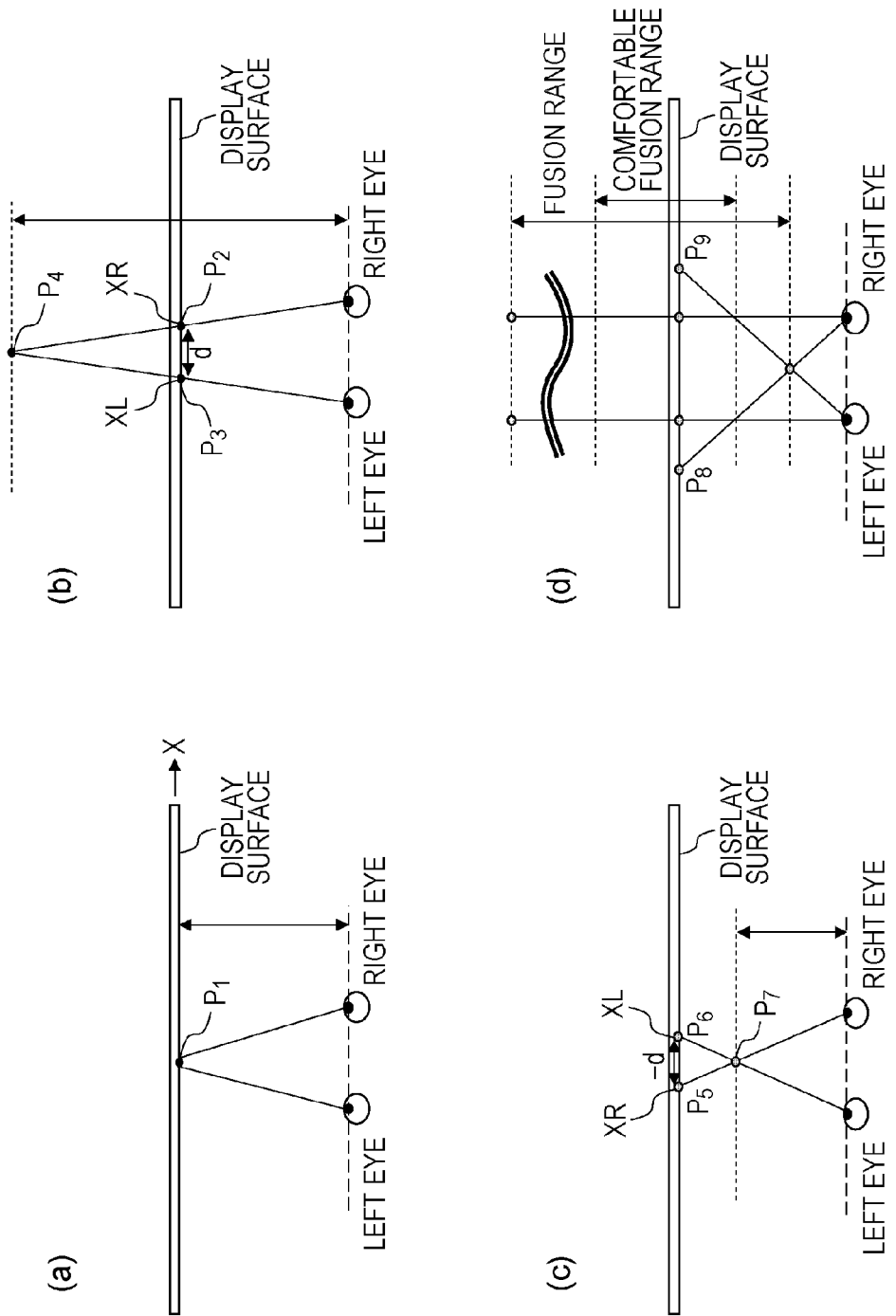

Parts (a) to (d) of FIG. 3 are top views illustrating the relationship between a parallax and display with a depth.

Figure 4:
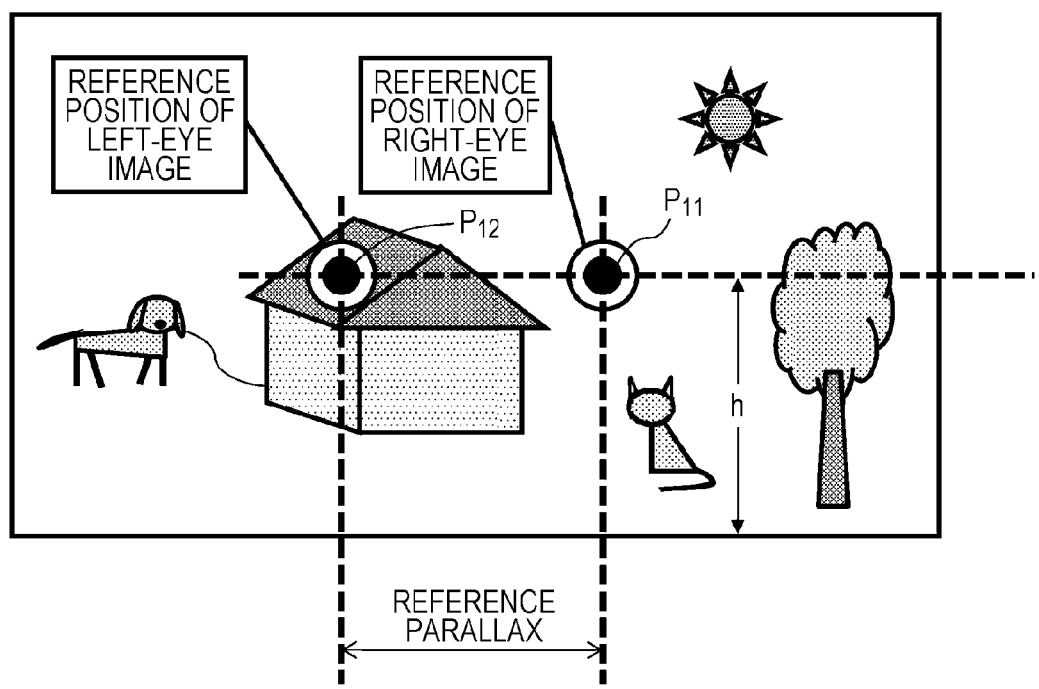

FIG. 4 is a diagram illustrating an example of setting reference positions (reference points).

Figure 5:
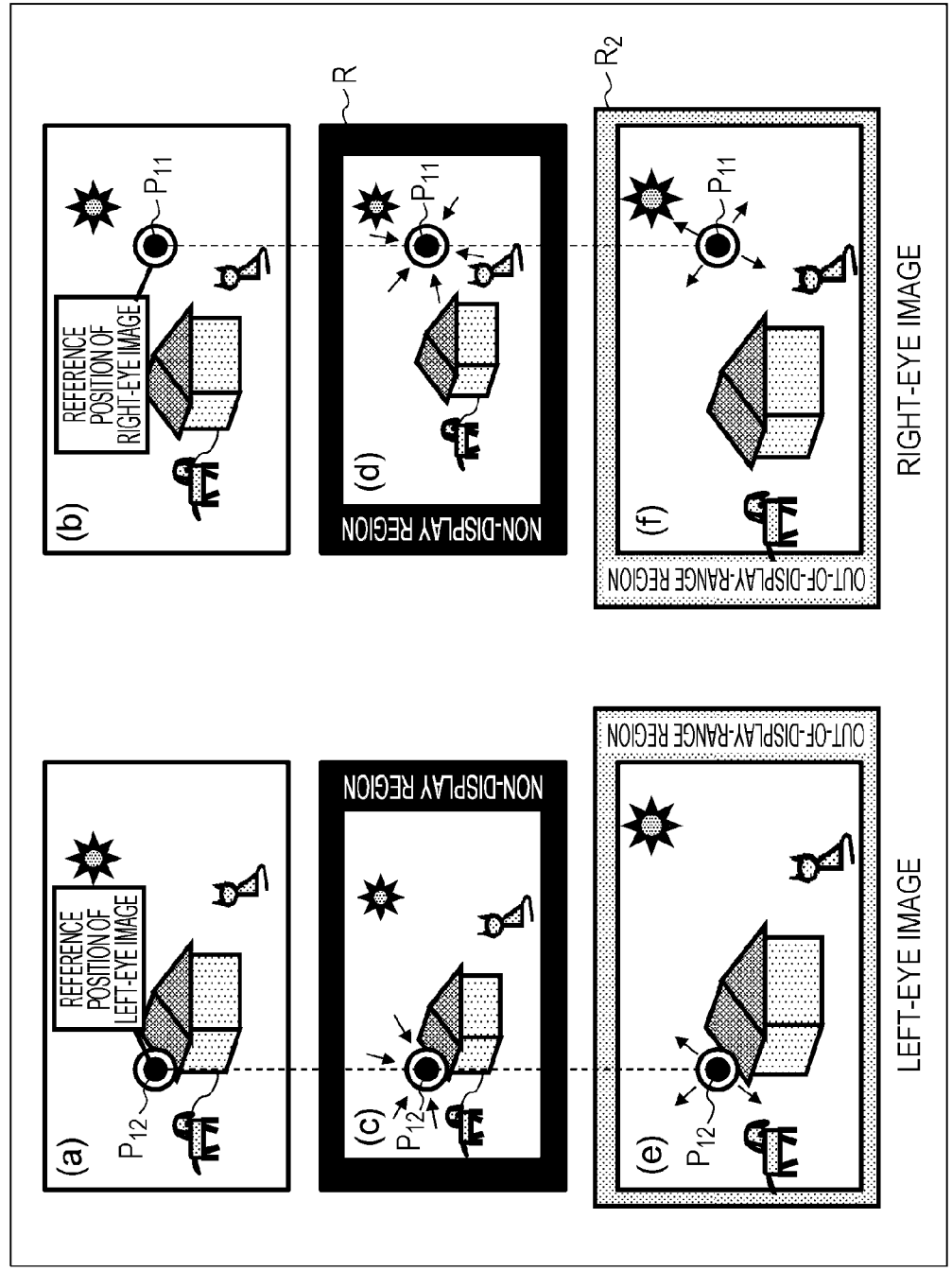

Parts (a) to (f) of FIG. 5 are diagrams illustrating details of processing according to a first embodiment of the present invention, and are diagrams illustrating a state where a right-eye image and a left-eye image are enlarged and reduced with respect to reference points $P_{11}$ and $P_{12}$, respectively.

Figure 6:
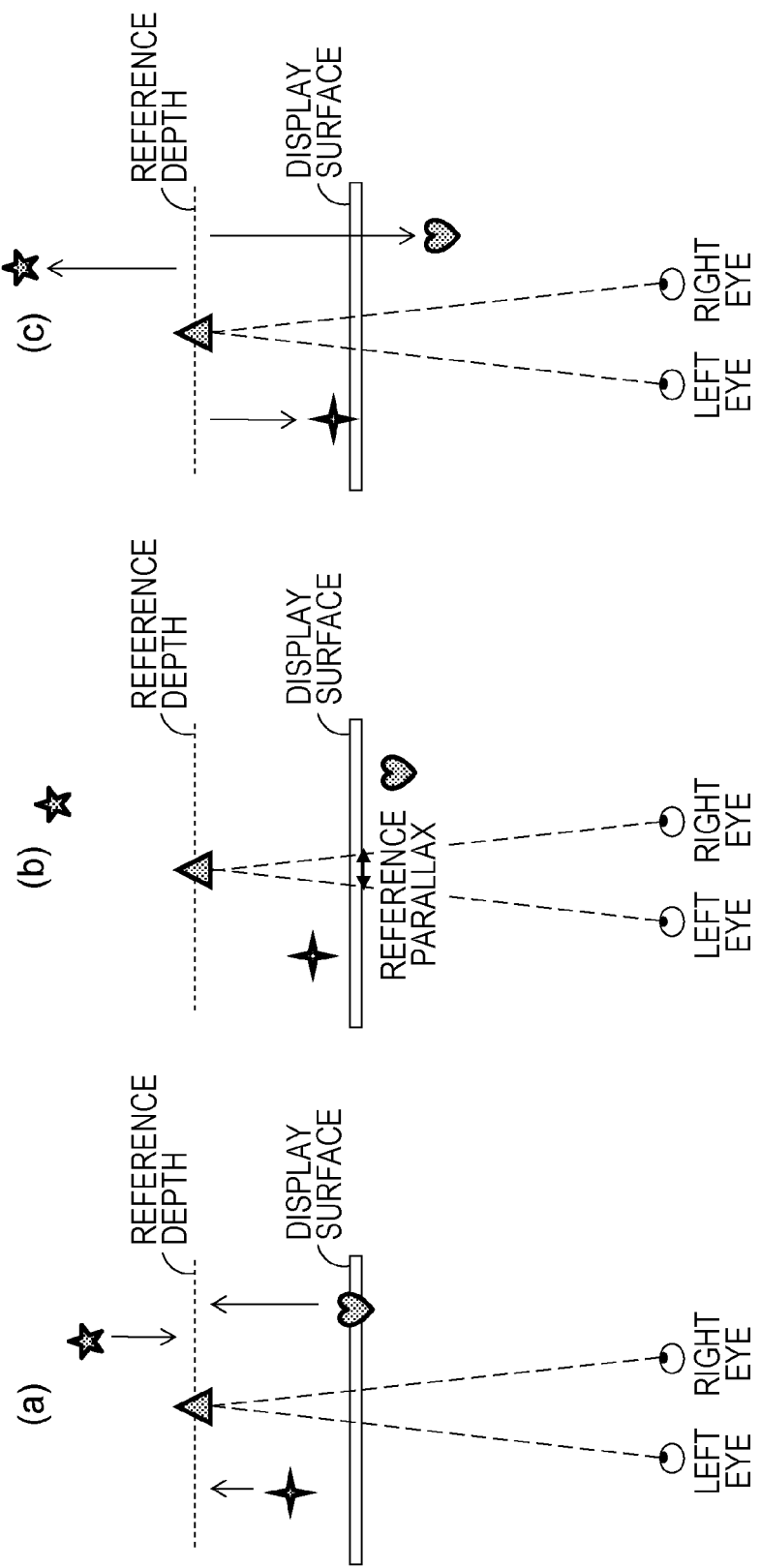

Parts (a) to (c) of FIG. 6 are diagrams illustrating a state where a sense of depth is adjusted with respect to a reference depth through enlargement or reduction.

Figure 7:
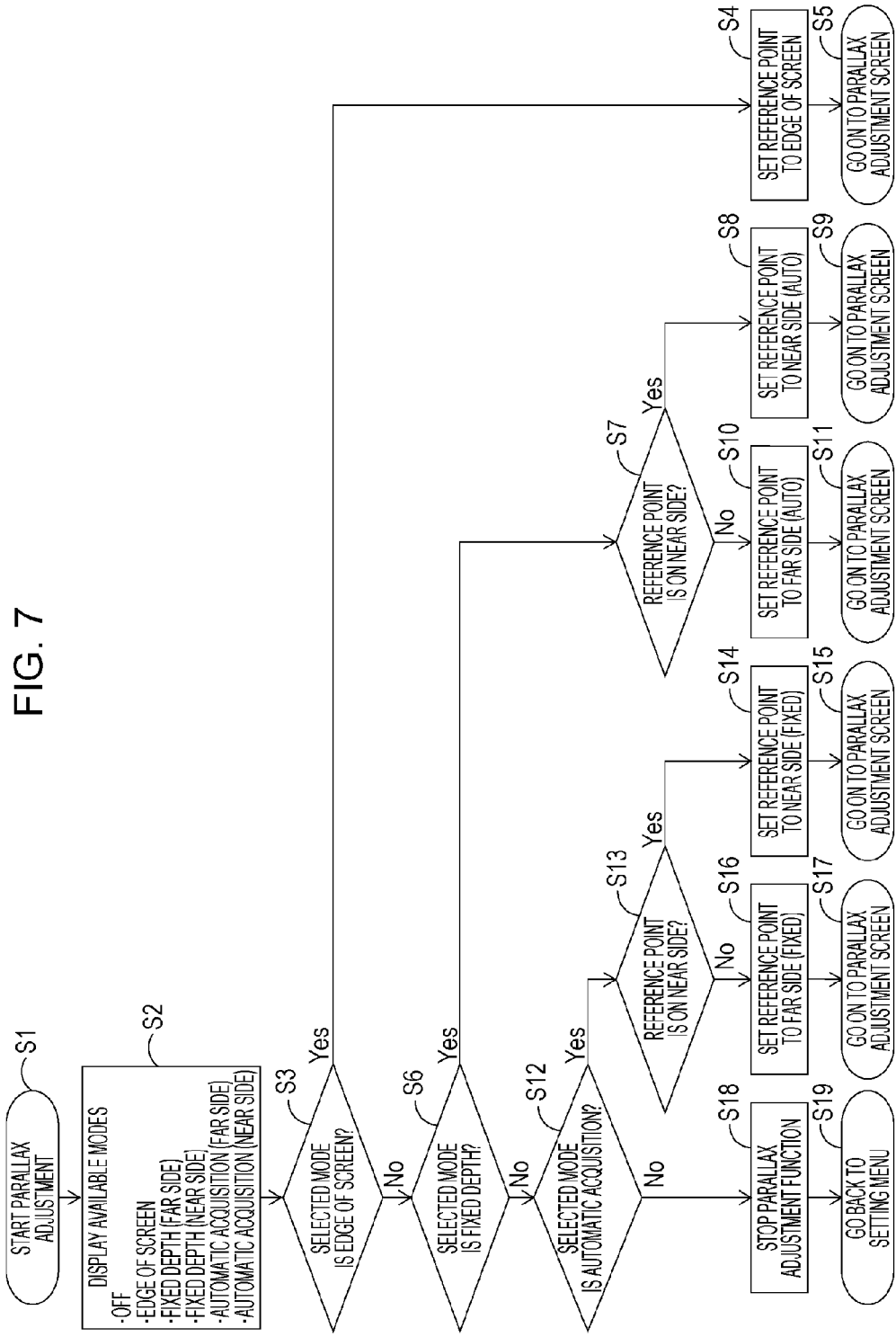

FIG. 7 is a flowchart illustrating a flow of mode selection processing before parallax adjustment is performed.

FIG. 8 includes diagrams illustrating a user interface for performing the processing illustrated in FIG. 7.

Figure 9:
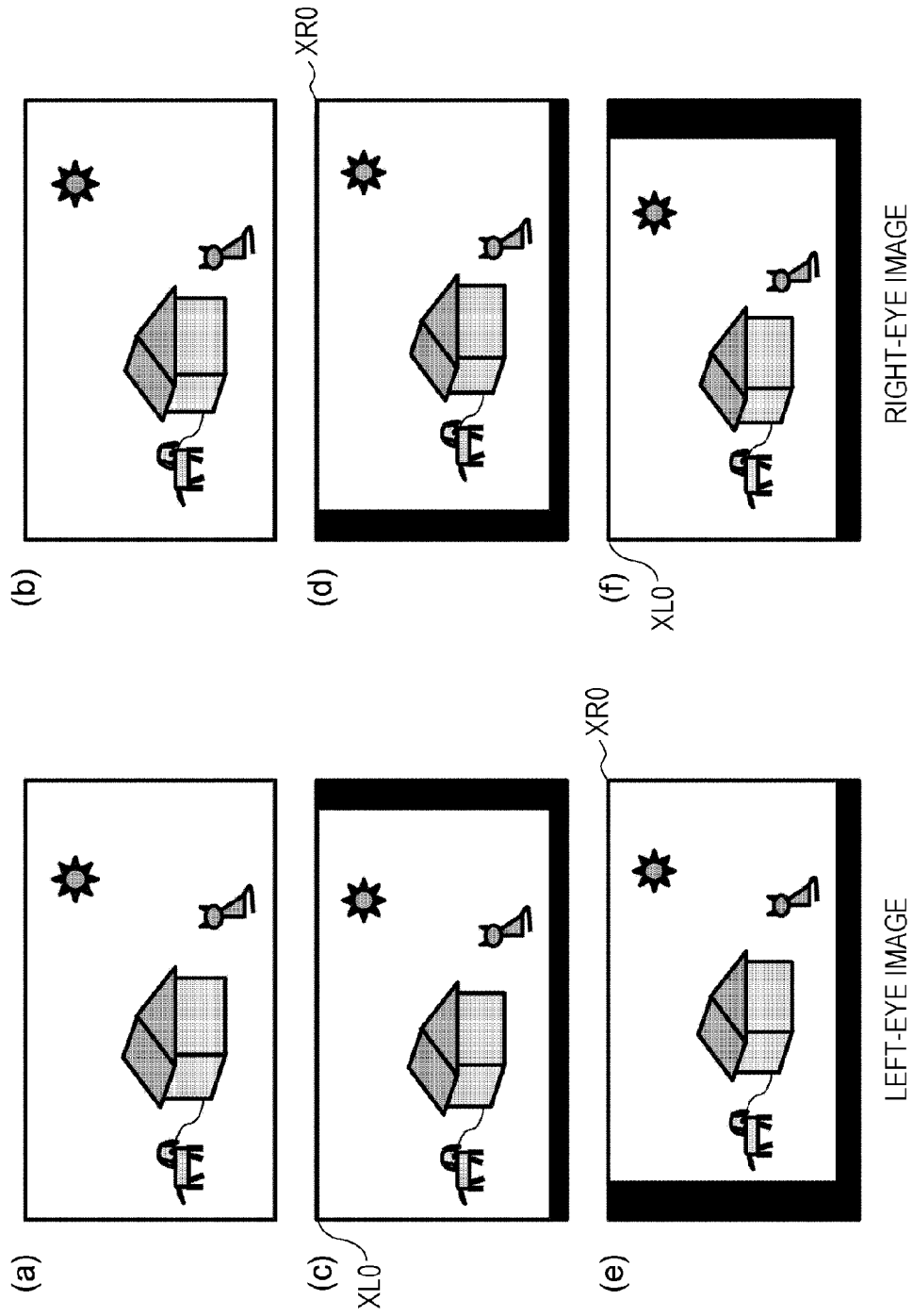

FIG. 9 includes diagrams illustrating a display example before and after image conversion.

Parts (a) and (b) of FIG. 10 are diagrams illustrating the relationships between a parallax and depth in the mode "edge of screen".

Part (a) of FIG. 11 is a diagram illustrating the relationship between a parallax and depth in the mode "fixed depth" (reference is on the far side), and part (b) of FIG. 11 is a diagram illustrating the relationship between a parallax and depth in the mode "fixed depth" (reference is on the near side).

FIG. 12 includes diagrams in which a change in parallax amount before and after conversion caused by enlargement or reduction is shown in graphs, and part (a) is a diagram illustrating an example of a case where a reference is at a left edge in a left-eye image and a reference is at a right edge in a right-eye image, and part (b) is a diagram illustrating an example of a case where a reference is at a right edge in a left-eye image and a reference is at a left edge in a right-eye image.

Figure 13:
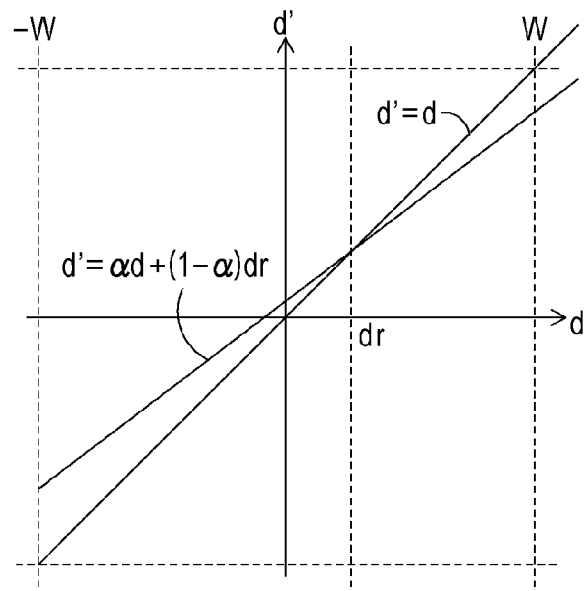

FIG. 13 is a diagram illustrating the relationship between parallax amounts d and d' before and after conversion.

Figure 14:
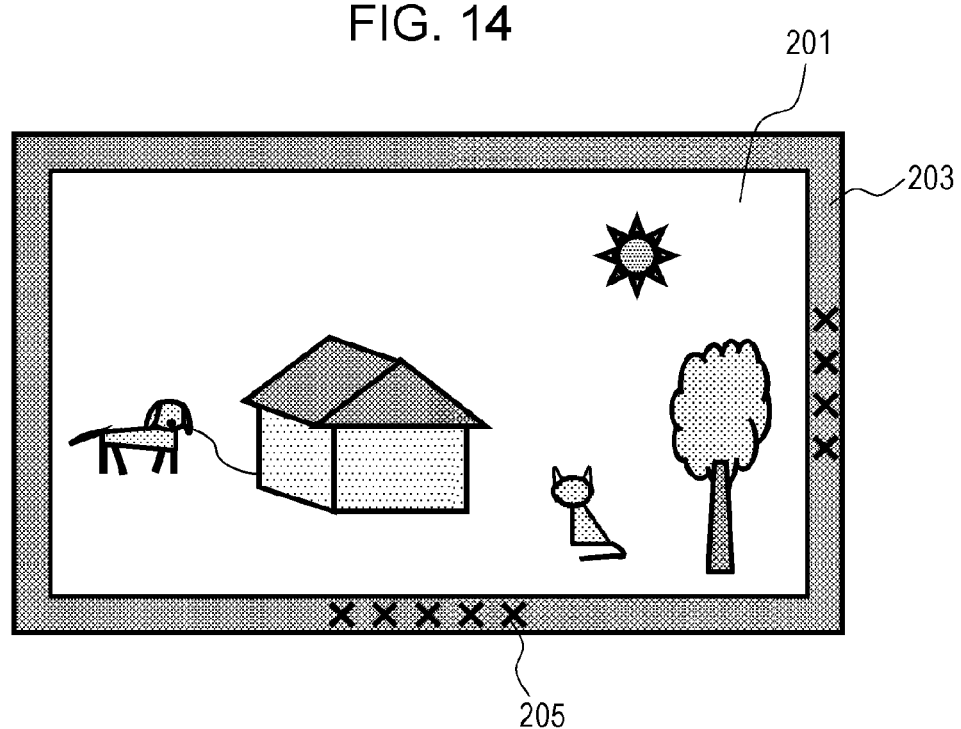

FIG. 14 is a diagram illustrating an example display of a frame image according to the first embodiment and a second embodiment.

Figure 15:
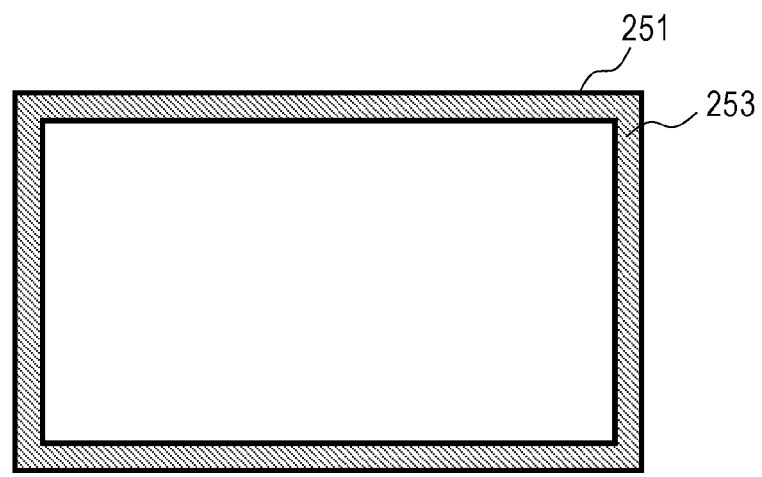

FIG. 15 is a diagram illustrating an example of a display screen of a stereoscopic image display device according to the second embodiment of the present invention.

FIG. 16 is a diagram illustrating an example display of a GUI of a stereoscopic image display device according to a fourth embodiment of the present invention.

DESCRIPTION OF EMBODIMENTS

First Embodiment

Figure 1:
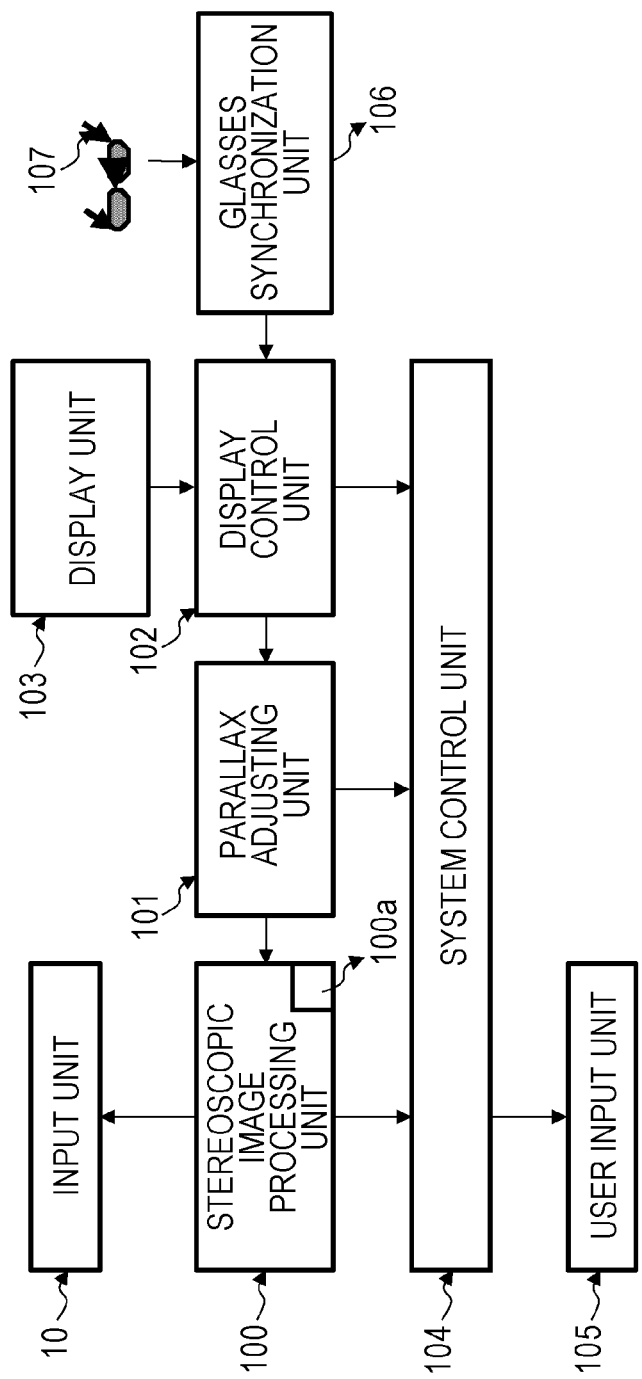
FIG. 1 is a functional block diagram illustrating an example configuration of a stereoscopic image display device according to an embodiment of the present invention.

Hereinafter, a stereoscopic image generation device according to a first embodiment of the present invention will be described with reference to the drawings. FIG. 1 is a functional block diagram illustrating an example configuration of a stereoscopic image display device including the stereoscopic image generation device according to this embodiment. As illustrated in FIG. 1, the stereoscopic image generation device according to this embodiment includes an input unit 10, a stereoscopic image processing unit 100 that processes image data input thereto and performs image processing for generating display data which can be stereoscopically displayed (hereinafter referred to as "stereoscopic image data"), a parallax adjusting unit 101 that adjusts a parallax of images, a display control unit 102 that performs display control so that an image is displayed on a display unit, and a system control unit 104 that controls the entire system. Furthermore, a display unit 103 that displays an image, a user input unit 105 with which a user performs input, and a glasses synchronization unit 106 that synchronizes shutter glasses are provided to constitute the stereoscopic image display device. Shutter glasses 107 are glasses worn by a user.

Figure 2:
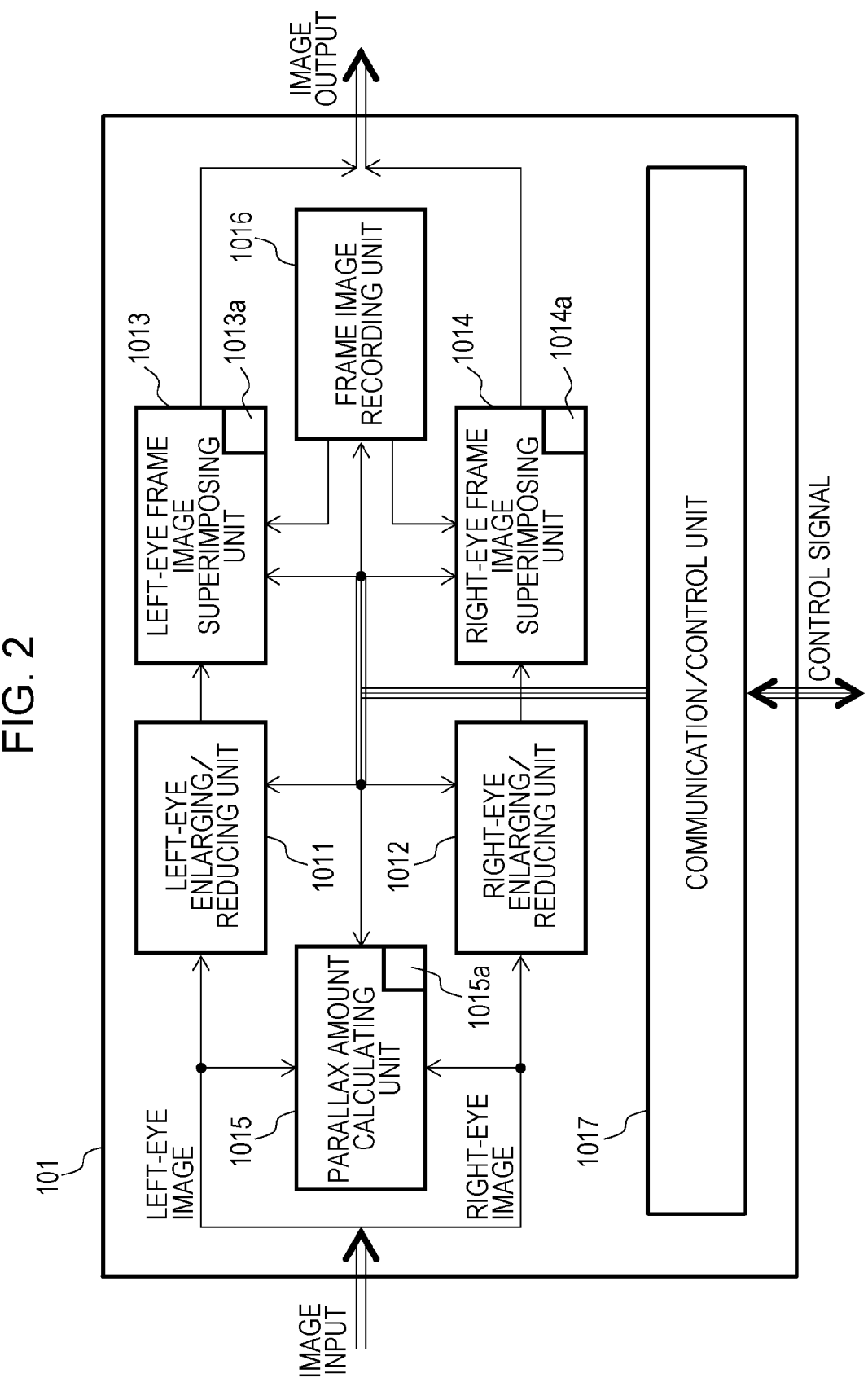
FIG. 2 is a functional block diagram illustrating an example configuration of a parallax adjusting unit according to an embodiment of the present invention.

FIG. 2 is a functional block diagram illustrating an example configuration of the parallax adjusting unit 101. As illustrated in FIG. 2, the parallax adjusting unit 101 further includes a left-eye enlarging/reducing unit 1011, a right-eye enlarging/reducing unit 1012, a left-eye frame image superimposing unit 1013, a right-eye frame image superimposing unit 1014, a parallax amount calculating unit 1015, a frame image recording unit 1016, and a communication/control unit 1017.

Next, the operations of the individual functional units will be described. Image data which has been input to the stereoscopic image display device via the input unit 10 is divided by the stereoscopic image processing unit 100 into left-eye image data and right-eye image data in accordance with an input format. If the input image data has additional information, the additional information is extracted and is transmitted to the system control unit 104. The image data input here is not limited and may be, for example, image data which has been transmitted on broadcast waves, image data which has been electronically read out from a recording medium, or image data which has been transmitted via a network. The right-eye image data and left-eye image data may be created from a single piece of image data. Alternatively, a multi-viewpoint image generated by combining image data and depth data, or multi-viewpoint image data generated by estimating depth data may be used.

The additional information is information attached to image data, and is called tag information or metadata. A reference parallax, which will be described below, may be obtained as additional information. Also, in a case where there is a frame image, which will be described below, or specification information about a frame image to be used, the frame image or the specification information is extracted here, and the system control unit 104 is notified of it.

The left-eye image data and right-eye image data are transmitted to the parallax adjusting unit 101, which adjusts the parallax thereof. In the parallax adjusting unit 101, the communication/control unit 1017 that communicates with the system control unit 104 controls the individual units. The parallax amount calculating unit 1015 receives an instruction from the system control unit 104 via the communication/control unit 1017, calculates a parallax amount by using a left-eye image and right-eye image in response to the instruction, and notifies the system control unit 104 of the parallax amount via the communication/control unit 1017.

The content of the notification may be information indicating parallaxes in individual regions of an entire display screen, for example, a so-called parallax map or the like, or may be maximum and minimum values of parallaxes corresponding to the farthest point and the nearest point. That is, the content of the notification may be information indicating the parallaxes between corresponding pixels in the corresponding left-eye image and right-eye image. The left-eye enlarging/reducing unit 1011 and the right-eye enlarging/reducing unit 1012 receive an instruction from the system control unit 104 via the communication/control unit 1017, and enlarge or reduce the left-eye image and right-eye image, respectively. Parallax amount adjustment information received from the communication/control unit 1017 is information including reference points of the left-eye image and right-eye image, and the ratios of enlargement or reduction of the left-eye image and right-eye image.

The left-eye frame image superimposing unit 1013 and the right-eye frame image superimposing unit 1014 receive an instruction from the system control unit 104 in a similar manner, and superimpose frame image data which has been read out from the frame image recording unit 1016 on the left-eye image and right-eye image, respectively. A frame image which has been extracted by the stereoscopic image processing unit 100 may also be recorded on the frame image recording unit 1016, as described above. The reference points of the left-eye image and right-eye image are located at different positions.

The left-eye image and right-eye image whose parallax has been adjusted are transmitted to the display control unit 102. The display control unit 102 performs display control in accordance with the display unit 103, and transmits a signal to the glasses synchronization unit 106. The glasses synchronization unit 106 transmits a synchronization signal to the shutter glasses 107 worn by a user, so that processing for synchronizing with the display unit 103 is performed.

More specifically, for example, in a case where a liquid crystal display panel is used as the display unit 103, left-eye images and right-eye images are alternately displayed, and stereoscopic viewing is achieved in synchronization with the shutter glasses 107 worn by a viewer, the display control unit 102 alternately outputs left-eye images and right-eye images to the display unit 103. The output frequency is, for example, 120 left-eye images and 120 right-eye images per second. The display unit 103 sequentially displays the images transmitted from the display control unit 102. When a left-eye image is displayed on the display unit 103, a left-eye shutter of the shutter glasses 107 is opened and a right-eye shutter thereof is closed so that the left-eye image is displayed for the left eye. When a right-eye image is displayed, the left-eye shutter is closed and the right-eye shutter is opened so that the right-eye image is displayed for the right eye. Accordingly, stereoscopic viewing is realized.

The viewer is capable of inputting parallax amount adjustment data for a screen to be displayed, by using the user input unit 105. The user input unit 105 may be realized by, for example, a remote control or the like, or may be realized by various types of means such as a keyboard, mouse, touch panel, or dial, and the input form thereof is not limited. The parallax amount adjustment data to be input may be data for indirectly selecting the reference positions and the enlargement/reduction ratios of a left-eye image and a right-eye image.

The parallax amount adjustment data input from the user input unit 105 is processed by the system control unit 104, is converted to a specific adjustment parameter, and is transmitted to the parallax adjusting unit 101. The parallax adjusting unit 101 performs parallax adjustment processing on the basis of the received parallax amount adjustment data. If the parallax amount adjustment data is data indicating that the parallax is not to be adjusted, the parallax adjusting unit 101 does not perform parallax adjustment processing, and outputs left-eye and right-eye image data.

FIG. 3 illustrates the relationships between a parallax and display with a depth. FIG. 3 includes top views of a viewer (only the right eye and left eye are illustrated here) and a display (display surface). A parallax is represented by d. Part (a) of FIG. 3 illustrates a normal two-dimensional display state, where corresponding points $P_1$ of a right-eye image and a left-eye image are at the same position on the display when a stereoscopic image is displayed. In this case, the points $P_1$ are perceived as being on the display. Part (b) of FIG. 3 illustrates a state where a corresponding point $P_2$ of a right-eye image is displaced to the right and a corresponding point $P_3$ of a left-eye image is displaced to the left on the display (parallax d). In this state, these points are perceived by the viewer as being behind the display surface ($P_4$). Part (c) of FIG. 3 illustrates a state where a corresponding point $P_5$ of a right-eye image is displaced to the left and a corresponding point $P_6$ of a left-eye image is displaced to the right on the display. In this state, these points are perceived by the viewer as being in front of the display surface ($P_7$). Part (d) of FIG. 3 is a diagram illustrating the above-described cases integrated together. As described above, in a case where the corresponding point of a right-eye image is displaced to the right and the corresponding point of a left-eye image is displaced to the left, and where the distance between the corresponding points is equal to the distance between both eyes, these points are perceived at infinity. However, in a case where the distance between the corresponding points exceeds the distance between both eyes, the line of sight does not match a divergence direction, and fusion is not achieved. Also, in a state where a corresponding point $P_8$ of a right-eye image is significantly displaced to the left and a corresponding point $P_9$ of a left-eye image is significantly displaced to the right on the display, the line of sight is in an extreme cross-eye state, and fusion is not achieved. Thus, a depth range in which comfortable stereoscopic viewing can be achieved, that is, the comfortable fusion range illustrated in part (d) of FIG. 3, is closer to the display surface than the fusion range. The comfortable fusion range varies in accordance with the correlation between a parallax and a distance of sight, and thus varies in accordance with the distance between the viewer and the display surface.

Next, a parallax adjustment method according to the embodiment of the present invention will be described. First, reference points $P_{11}$ and $P_{12}$, which serve as center points of enlargement/reduction, are set at different positions for a right-eye image and a left-eye image, respectively. FIG. 4 is a diagram illustrating an example of setting the reference points (reference positions) $P_{11}$ and $P_{12}$. The parallax between the corresponding points on the right-eye image and left-eye image is changed by uniformly enlarging or reducing the right-eye image and left-eye image with respect to the reference points $P_{11}$ and $P_{12}$, that is, with the reference points $P_{11}$ and $P_{12}$ being at the center. The reference points $P_{11}$ and $P_{12}$ may be on the same plane as the right-eye image and left-eye image. If the reference points are set within a display region, partial loss of an image caused by reduction is prevented. Also, it is desirable that the reference points $P_{11}$ and $P_{12}$ of the right-eye image and left-eye image be at the same height h (the position in the vertical direction of the display screen).

FIG. 5 is a diagram illustrating a state where the right-eye image and left-eye image are enlarged and reduced with respect to the reference points $P_{11}$ and $P_{12}$, respectively. Parts (a) and (b) of FIG. 5 are the left-eye image and right-eye image before parallax adjustment is performed, respectively, parts (c) and (d) of FIG. 5 are the left-eye image and right-eye image which have been adjusted to be reduced, and parts (e) and (f) of FIG. 5 are the images which have been adjusted to be enlarged. The arrows represent the states of enlargement and reduction, and the images are uniformly enlarged or reduced with reference to the reference points. The reference position of the left-eye image and the reference position of the right-eye image do not change even if enlargement or reduction is performed.

As illustrated in parts (c) and (d) of FIG. 5, reduction adjustment generates a non-display region R in which no image is displayed within the display screen. As illustrated in parts (e) and (f) of FIG. 5, enlargement adjustment generates a region in which an image cannot be displayed, that is, an out-of-display-range region $R_2$.

As a result of providing the reference points $P_{11}$ and $P_{12}$ to the right-eye image and left-eye image, respectively, a distance is generated between the reference points $P_{11}$ and $P_{12}$. Here, a parallax corresponding to the lateral distance between the reference points $P_{11}$ and $P_{12}$ is referred to as a reference parallax, and a depth represented by the reference parallax is referred to as a reference depth. If the right-eye image and left-eye image are enlarged or reduced with respect to the reference points $P_{11}$ and $P_{12}$, that is, with reference to the reference points, the difference between the reference parallax and the parallax of the images is increased or decreased. That is, the sense of depth of a stereoscopic image increases or decreases with reference to the reference depth corresponding to the reference parallax. Thus, for example, in a case where a reference parallax is set so that a wall which is displayed in a stereoscopic image and which has a uniform depth serves as a reference depth, the sense of depth can be adjusted in accordance with enlargement of the image so that an object in front of the wall is perceived as being closer and an object behind the wall is perceived as being farther, with the depth of the wall unchanged. In parts (a) to (f) of FIG. 5, the reference points in the horizontal direction and vertical direction are located so as to be at the same position on the display.

FIG. 6 includes diagrams illustrating examples of the above-described state. Part (b) of FIG. 6 is a top view illustrating the positional relationship among displayed objects before parallax adjustment is performed. Part (a) of FIG. 6 is a diagram illustrating a state where reduction adjustment is performed on the screen, and part (c) of FIG. 6 is a diagram illustrating a state where enlargement adjustment is performed on the screen.

As illustrated in FIG. 4, the depth generated by giving a reference parallax to the left-eye image and right-eye image is perceived by a user. Enlargement or reduction of the left-eye image and right-eye image causes the user to feel as if the image the user is viewing has been enlarged or reduced in the reference depth. Thus, if reduction adjustment is uniformly performed with reference to the reference points, as illustrated in part (a) of FIG. 6, the sense of depth is adjusted so that an image perceived on the near side is perceived on the farther side and an image perceived on the opposite side of the display surface is perceived on the nearer side, with reference to the reference depth which is determined by the reference points of the left and right images.

On the other hand, if enlargement adjustment is performed as illustrated in part (c) of FIG. 6, the sense of depth is adjusted so that an image perceived on the near side is perceived on the nearer side and an image perceived on the far side is perceived on the farther side, with reference to the reference depth. Note that, in both of enlargement and reduction, the sense of depth for the image existing at the reference depth (represented by a triangle mark in the figure) does not change.

FIG. 6 illustrates examples in which uniform enlargement or reduction is performed in a plane with respect to the reference points. Alternatively, as described above, enlargement or reduction only in the lateral direction may be performed in the plane. Also, in a case where the reference points $P_{11}$ and $P_{12}$ of the right-eye image and left-eye image are symmetrically positioned right and left with respect to the center of the screen, as illustrated in FIG. 4, the center of the image is not displaced right or left in accordance with enlargement or reduction. Also, in a case where the reference points $P_{11}$ and $P_{12}$ are set on a certain displayed object in an image, displacement of the display position of the certain displayed object in the depth direction, which may occur in accordance with enlargement or reduction, can be prevented.

Next, an example of an actual operation performed by a viewer will be described. The viewer enters a mode of adjusting a parallax amount by operating the user input unit 105. In the mode of adjusting a parallax amount, the viewer selects a mode of adjusting a parallax amount in accordance with the flowchart illustrated in FIG. 7. Parallax adjustment processing is started in step S1, and available modes are displayed in step S2. The modes of adjusting a parallax amount are distinguished from one another in accordance with, for example, the position of a reference point serving as a reference of parallax adjustment processing, and include six types of modes: the position of a reference point is at an edge of the screen, fixed depth (far side), fixed depth (near side), automatic acquisition (far side), automatic acquisition (near side), and off. Note that "off" indicates that parallax adjustment is not performed. The position of a reference point serving as a reference of the parallax adjustment processing is selected in accordance with the selected mode. That is, in step S3, it is determined whether or not the selected mode is "edge of screen". If the determination result is "Yes", the processing proceeds to step S4, where the reference point is set at an edge of the screen, and goes on to a parallax adjustment screen (step S5). If the determination result in step S3 is "No", the processing proceeds to step S6, where it is determined whether or not the selected mode is "fixed depth". If the determination result is "Yes", the processing proceeds to step S7, where it is determined whether or not the reference point is on a near side. If the determination result is "Yes", the processing proceeds to step S8, where the reference point is set to a near side (auto), and goes on to the parallax adjustment screen in step S9. If the determination result in step S7 is "No", the processing proceeds to step S10, where the reference point is set to a far side (auto), and goes on to the parallax adjustment screen in step S11. If the determination result in step S6 is "No", the processing proceeds to step S12, where it is determined whether or not the selected mode is "automatic acquisition". If the determination result is "Yes", the processing proceeds to step S13, where it is determined whether or not the reference point is on a near side. If the determination result is "Yes", the reference point is set to a near side (fixed) in step S14, and goes on to the parallax adjustment screen in step S15. If the determination result in step S13 is "No", the processing proceeds to step S16, where the reference point is set to a far side (fixed), and goes on to the parallax adjustment screen in step S17. If the determination result in step S12 is "No", the processing proceeds to step S18, where the parallax adjustment function is stopped, and returns to the setting menu in step S19.

The control according to the flowchart in FIG. 7 can be realized by, for example, the user interface illustrated in FIG. 8.

Part (a) of FIG. 8 illustrates a screen for showing available modes to a viewer and prompting the viewer to select a mode. The viewer selects one of the available modes on the screen by operating the user input unit 105. In part (a) of FIG. 8, "fixed depth: far side" is selected. If the viewer performs selection confirmation processing by operating the user input unit 105 in this state, the screen shifts to the parallax adjustment screen corresponding to the selected mode. For example, in the case of "fixed depth: far side", the screen shifts to the screen illustrated in part (c) of FIG. 8. In this state, the viewer moves a slide bar S displayed on the right of the screen by operating the user input unit 105, and thereby sets a corresponding parallax adjustment amount. Part (e) of FIG. 8 illustrates a state where an operation of narrowing a depth range has been performed. Because parallax amount adjustment has been performed in the direction of decreasing the parallax, the screen is displayed in a reduced size.

Parts (b) and (d) of FIG. 8 illustrate adjustment screens for the mode "edge of screen". If the viewer selects "edge of screen" in part (a) of FIG. 8, the screen shifts to the screen illustrated in part (b) of FIG. 8. If the viewer performs an operation of adjusting the image in the far-side direction by moving the slide bar S in this state, the left-eye image is reduced with reference to the upper-left of the screen and right-eye image is reduced with reference to the upper-right of the screen, as illustrated in part (d) of FIG. 8, so that the depth is adjusted. In FIG. 8, the left-eye image and right-eye image are superimposed on each other.

With the above-described operation performed by the viewer, the system control unit 104 is capable of setting the positions of reference points and a parallax adjustment amount for the parallax adjusting unit 101. Here, the positions of reference points are, for example, as illustrated in FIG. 7, any one of the six types: edge of screen, fixed depth (far side), fixed depth (near side), automatic acquisition (far side), automatic acquisition (near side), and off.

Hereinafter, description will be given of a method for setting the positions of reference points and a method for adjusting a parallax in accordance with a selected position of a reference point. FIG. 3 is also used for the description. Hereinafter, the horizontal axis is regarded as an X axis, the X coordinate of the left edge of the screen is represented by 0, the X coordinate of the right edge of the screen is represented by W, the X coordinate of the reference point of a left-eye image is represented by XL0, the X coordinate of the reference point of a right-eye image is represented by XR0, and a difference between the reference points, that is, a parallax of the reference points is represented by a reference parallax dr (dr=XR0−XL0). At this time, when the parallax d has a positive value, the right-eye image is on the right side with respect to the left-eye image, that is, a parallax for a far side is generated (see part (b) of FIG. 3). When the parallax d has a negative value, the right-eye image is on the left side with respect to the left-eye image, that is, a parallax for a near side is generated (see part (c) of FIG. 3).

[Edge of screen] Two methods of setting a reference are available in parallax adjustment in which reference points are set at the left and right edges of the screen. First, an example is discussed in which the reference point of the left-eye image is set on the left edge of the screen, the reference point of the right-eye image is set on the right edge of the screen, and the individual images are uniformly reduced with respect to the reference points to adjust the parallax. That is, in the above-described coordinates, the reference points are set at the edges of the screen, and thus $$XL0=0$$

$$XR0=W$$

are satisfied as illustrated in part (a) of FIG. 10.

The viewer adjusts a parallax amount by operating the user input unit 105. The adjusted parallax amount is provided to the parallax adjusting unit 101 via the system control unit 104, for example, as an enlargement ratio of the image. At this time, the enlargement ratio of the image is represented by α (an enlargement ratio α of higher than 1 corresponds to enlargement, and an enlargement ratio α of lower than 1 corresponds to reduction), the X coordinate of an arbitrary point on the right-eye image is represented by XR, and the X coordinate of an arbitrary point on the left-eye image is represented by XL. In this case, the X coordinate XR' of a point converted on the right-eye image and the X coordinate XL' of a point converted on the left-eye image are expressed as follows.

$$XL'=\alpha XL$$

$$XR'=W-\alpha(W-XR)$$

At this time, when the parallax amount before conversion is represented by d, the parallax amount d' after conversion is expressed as follows.

$$d = XR - XL$$

$$\begin{aligned}d' &= XR' - XL' \\ &= W - \alpha(W - XR) - \alpha XL \\ &= \alpha(XR - XL) + W(1 - \alpha) \\ &= \alpha d + W(1 - \alpha)\end{aligned}$$

Therefore, in this case, it is understood that a point on the screen moves in the far-side direction under the condition d<W, in which the parallax d' after conversion increases in accordance with a decrease in the enlargement ratio α. An example of the left-eye image before conversion at this time is illustrated in part (a) of FIG. 9, an example of the right-eye image before conversion is illustrated in part (b) of FIG. 9, an example of the left-eye image after conversion is illustrated in part (c) of FIG. 9, an example of the right-eye image after conversion is illustrated in part (d) of FIG. 9(d), and a graph showing the change in parallax amount before and after conversion is illustrated in part (a) of FIG. 12.

Part (c) of FIG. 9 is a diagram in which the left-eye image is reduced with reference to the reference point XL0 which is on the left edge of the screen, and part (d) of FIG. 9 is a diagram in which the right-eye image is reduced with reference to the reference point XR0 which is on the right edge of the screen. As a result, the distance between corresponding points of the left-eye image and right-eye image increases, that is, the parallax amount d increases, and the entire screen moves in the far-side direction.

Likewise, part (e) of FIG. 9 is a diagram in which the left-eye image is reduced with reference to the reference point XR0 which is on the right edge of the screen, and part (f) of FIG. 9 is a diagram in which the right-eye image is reduced with reference to the reference point XL0 which is on the left edge of the screen. As a result, the distance between corresponding points of the left-eye image and right-eye image decreases, that is, the parallax amount d decreases, and the entire screen moves in the near-side direction.

At this time, the right-eye image and left-eye image have respective reference points on both edges of the screen. Thus, in the display unit 103, the screen can be effectively used without generating a non-display region at the left and right edges of the screen, in view of both of the display time of the right-eye image and the display time of the left-eye image. In this case, a non-display region is generated at the bottom of the screen in accordance with a decrease in enlargement ratio α. However, this region may be used as a region for displaying other things, for example, captions, so that the screen region can be effectively used without giving an influence on a stereoscopic image.

In the above description, the reference points are set on both the edges of the screen. Accordingly, a non-display region can be provided at the bottom of the screen in a concentrated manner. If the reference points are set at the center in the vertical direction, non-display regions having the same width can be provided at the top and bottom. The positions in the vertical direction of the reference points may be arbitrarily set, but it is desirable that the reference point of the right-eye image and the reference point of the left-eye image be at the same height.

The generation of the non-display region at the bottom of the screen can be prevented by reducing the image only in the lateral direction. At this time, the image becomes vertically long as a result of being reduced in the lateral direction. However, as long as the enlargement ratio α is approximately 1, it is less likely to be perceived that the image is vertically long. Actually, α is in the range of 0.9 to 1 in many cases, and thus deformation of the image is not so significant. If the enlargement ratio α is less than 0.5, the left-eye image and right-eye image are completely separated from each other, and stereoscopic viewing is not achieved. Also, under the condition d>W, that is, in a state where the width between corresponding points exceeds the width of the screen, the corresponding points do not exist on the screen, and stereoscopic viewing is not achieved.

Next, description will be given of an example in which the reference point of the left-eye image is set on the right edge of the screen, the reference point of the right-eye image is set on the left edge of the screen, and a parallax is adjusted by uniformly reducing the individual images with respect to the reference points. That is, as illustrated in part (b) of FIG. 10, $$XL0 = W$$

$$XR0 = 0$$

are satisfied.

As in the above-described example, in a case where the X coordinate of an arbitrary point on the right-eye image is represented by XR and the X coordinate of a an arbitrary point on the left-eye image is represented by XL, the X coordinate XR' of the point converted on the right-eye image and the X coordinate XL' of the point converted on the left-eye image are expressed as follows.

$$XL' = W - \alpha(W - XL)$$

$$XR' = \alpha XR$$

At this time, in a case where the parallax amount before conversion is represented by d, the parallax amount d' after conversion is expressed as follows.

$$d = XR - XL$$

$$\begin{aligned}d' &= XR' - XL' \\ &= \alpha XR - W + \alpha(W - XL) \\ &= \alpha(XR - XL) - W(1 - \alpha) \\ &= \alpha d - W(1 - \alpha)\end{aligned}$$

Therefore, in this case, it is understood that a point on the screen moves in the near-side direction under the condition d<W, in which the parallax d' after conversion decreases in accordance with a decrease in the enlargement ratio α. An example of the left-eye image after conversion at this time is illustrated in part (e) of FIG. 9, an example of the right-eye image after conversion is illustrated in part (f) of FIG. 9, and a graph showing the change in parallax amount before and after conversion is illustrated in part (b) of FIG. 12.

At this time, the right-eye image has a reference point on the left edge of the screen, and the left-eye image has a reference point on the right edge of the screen. Thus, in the display unit 103, the screen can be effectively used without generating a non-display region at the left and right edges of the screen, in view of both of the display time of the right-eye image and the display time of the left-eye image.

The above-described control is associated with a displacement in the far-side direction and a displacement in the near-side direction in an operation of the user input unit 105. Also, control is performed to continuously realize the former, that is, the mode in which the reference point of the left-eye image is on the left edge of the screen and the reference point of the right-eye image is on the right edge of the screen in a case where an operation in the far-side direction is performed, and the latter, that is, the mode in which the reference point of the left-eye image is on the right edge of the screen and the reference point of the right-eye image is on the left edge of the screen in a case where an operation in the near-side direction is performed, with a parallax non-adjustment state therebetween. Accordingly, a parallax can be continuously adjusted in the near-side direction and the far-side direction without causing partial loss of an image, which is convenient. At this time, the system control unit 104 updates the reference positions of the left and right images and the enlargement ratio α for the parallax adjusting unit 101.

In a case where partial loss of an image is allowed, the enlargement ratio α may be continuously changed from the reduction side to the enlargement side with an enlargement ratio of 1 therebetween. In this case, if the reference point of the left-eye image is on the left edge of the screen and the reference point of the right-eye image is on the right edge of the screen, displayed objects may be moved in the far-side direction in accordance with reduction of the image, and the displayed objects may be moved in the near-side direction in accordance with enlargement of the image.

In this case, an object on the screen which moves in the far-side direction is displayed in a small size, and an object on the screen which moves in the near-side direction is displayed in a large size. Thus, perceptual unnaturalness can be decreased in association with the relationship between the distance and size of objects.

[Fixed depth: far side] Now, description will be given of a process of setting a depth position behind the screen as a reference depth and increasing or decreasing the depth with respect to the reference depth. In this case, adjustment of increasing or decreasing a relative depth with respect to the reference depth can be performed without changing the depth position of an object existing at the reference depth, as described above. A reference parallax may be, for example, a value corresponding to a binocular distance of a viewer or a safe value obtained through statistics (for example, 5 cm). As illustrated in part (a) of FIG. 11, in a case where the reference parallax corresponding to the reference depth is represented by df, XL0 and XR0 are set so that $$df = XR0 - XL0 (df \geq 0)$$

is satisfied. Particularly, in a case where XL0 and XR0 are symmetrically located on the left and right with respect to the center of the screen, $$XL0 = W/2 - df/2$$

$$XR0 = W/2 + df/2$$

are satisfied. The parallax adjustment method will be described below.

[Fixed depth: near side] Now, description will be given of a process of setting a depth position in front of the screen as a reference depth and increasing or decreasing the depth with respect to the reference depth. A reference parallax may be, for example, a value corresponding to a fusion limit of a viewer or a safe value obtained through statistics (for example, a parallax angle of one degree). As illustrated in part (b) of FIG. 11, in a case where the reference parallax corresponding to the reference depth is represented by dn, XL0 and XR0 are set so that $$dn = XR0 - XL0 (dn < 0)$$

is satisfied. Particularly, in a case where XL0 and XR0 are symmetrically located on the left and right with respect to the center of the screen, $$XL0 = W/2 - dn/2$$

$$XR0 = W/2 + dn/2$$

are satisfied. The parallax adjustment method will be described below.

[Automatic acquisition: far side] Description will be given of a process of setting, as a reference parallax, a parallax of a far-end view acquired as metadata from played back content via the stereoscopic image processing unit 100, or a parallax of a far-end view acquired through parallax analysis, and increasing or decreasing a depth with respect to the corresponding reference depth. In this case, a region on the near side of depth can be adjusted without changing the maximum depth position of content. The reference parallax may be regarded as a value added to the content. In this case, a case where the reference parallax is 0 or more corresponds to this mode.

Here, in a case where the reference parallax is represented by dfa, XL0 and XR0 are set so that $$dfa = XR0 - XL0 (dfa \geq 0)$$

is satisfied. Particularly, in a case where XL0 and XR0 are symmetrically positioned on the left and right with respect to the center of the screen, $$XL0 = W/2 - dfa/2$$

$$XR0 = W/2 + dfa/2$$

are satisfied. In a case where a parallax larger than a set value is detected through parallax analysis, the set value may be updated. The parallax adjustment method will be described below.

[Automatic acquisition: near side] Description will be given of a process of setting, as a reference parallax, a parallax of a nearest view acquired as metadata from played back content via the stereoscopic image processing unit 100, or a parallax of a nearest view acquired through parallax analysis, and increasing or decreasing a depth with respect to the corresponding reference depth. The reference parallax may be regarded as a value added to the content. In this case, a case where the reference parallax is smaller than 0 corresponds to this mode.

Here, in a case where the reference parallax is represented by dna, XL0 and XR0 are set so that $$dna = XR0 - XL0 (dna < 0)$$

is satisfied. Particularly, in a case where XL0 and XR0 are symmetrically located on the left and right with respect to the center of the screen, $$XL0 = W/2 - dna/2$$

$$XR0 = W/2 + dna/2$$

are satisfied. In a case where a parallax smaller than a set value is detected through image analysis, the set value may be updated. The parallax adjustment method will be described below.

The reference value is set in the above-described manner.
(Parallax Adjustment Method)

Next, the parallax adjustment method will be described. As described above, the parallax of the right-eye image and left-eye image is adjusted by uniformly enlarging or reducing the individual images with respect to the reference points.

At this time, the horizontal axis is regarded as an X axis, an enlargement ratio of an image is represented by $\alpha$ (an enlargement ratio $\alpha$ of less than 1 corresponds to reduction), the X coordinate of the left edge of the screen is represented by 0, the X coordinate of the right edge of the screen is represented by M, the X coordinate of an arbitrary point on the right-eye image is represented by XR, and the X coordinate of an arbitrary point on the left-eye image is represented by XL. In this case, the X coordinate XR' of the point converted on the right-eye image and the X coordinate XL' of the point converted on the left-eye image are expressed as follows.

$$XL' = \alpha(XL - XL0) + XL0$$

$$XR' = \alpha(XR - XR0) + XR0$$

At this time, when the parallax amount before conversion is d, the parallax amount d' after conversion is expressed as follows.

$$\begin{aligned} d &= XR - XL \\ d' &= XR' - XL' \\ &= \alpha(XR - XR0) + XR0 - \alpha(XL - XL0) - XL0 \\ &= \alpha(XR - XL) + (1 - \alpha)(XR0 - XL0) \\ &= \alpha d + (1 - \alpha)dr \end{aligned}$$

FIG. 13 is a diagram illustrating the relationship between the parallax amount d before conversion and the parallax amount d' after conversion. According to this method, a process of moving a depth position in the near-side direction or far-side direction in accordance with the value of $\alpha$ with respect to a reference depth can be performed without moving a point having a parallax amount of a reference depth, that is, a point at which d=dr, in the depth direction. That is, for example, when it is assumed that a binocular distance of a viewer is regarded as a reference parallax, control can be performed to, without changing the depth of a background image having a depth of infinity for the viewer, move the depth positions of the other displayed objects in the near-side direction or far-side direction, and depth adjustment can be performed easily and safely.

Here, the enlargement ratio α may be manually set in accordance with the preference of a viewer, or may be automatically set by analyzing the left-eye image and right-eye image (parallax amount analyzing means). More specifically, the enlargement ratio α is set by acquiring a parallax of the left-eye image and right-eye image and by analyzing the feature thereof. For example, the enlargement ratio α is set by acquiring a distribution of parallaxes and considering the maximum value and minimum value among the parallaxes, that is, the parallax of the far-end view and the parallax of the nearest view. The difference between the parallax of the far-end view and the parallax of the nearest view represents the width of the parallax which is expressed on the screen. If the width of the parallax exceeds a certain range, a negative influence such as fatigue of the viewer may arise. Thus, a value calculated by dividing the difference in parallax by a parallax amount in the certain range is set as α, so that the width of a parallax amount to be displayed can be set to be within the certain range. Also, an amount of pop-up from a reference depth can be controlled by controlling the difference between a reference parallax and a parallax of the nearest view, and an amount of depth from the reference depth can be controlled by controlling the difference between the reference parallax and a parallax of the far-end view. Also, a burden on eyes can be reduced by determining dispersion of a parallax amount of the entire screen, detecting an image with high dispersion as an image having a large burden on eyes, and decreasing the parallax amount.

That is, the distance to the far-end view can be adjusted by setting an enlargement ratio on the basis of the ratio of the difference between a parallax amount of the far-end view acquired by the parallax amount acquiring unit and a parallax amount associated with a reference position in the depth direction, to a certain parallax amount. Also, a maximum amount of pop-up can be adjusted by setting an enlargement ratio on the basis of the ratio of the difference between a parallax amount of the nearest view acquired by the parallax amount acquiring unit and a parallax amount associated with a reference position in the depth direction, to a certain parallax amount. Also, a parallax range can be adjusted by setting an enlargement ratio on the basis of the ratio of the difference between the parallax amount of the far-end view and the parallax amount of the nearest view acquired by the parallax amount acquiring unit, to a certain parallax amount.

Here, the range of possible parallaxes varies depending on the age or pupillary distance of a viewer, how much the viewer has become used to a stereoscopic image, or the preference of the viewer. As described above, a dangerous situation may occur if the maximum value of a parallax exceeds the pupillary distance of the viewer, and thus setting of possible values is important. The range of possible parallaxes may be set using the values with which the pupillary distance of the viewer can be estimated, for example, the age, sex, or size of hat.

In the description given above, uniform enlargement or uniform reduction is performed. As described above, enlargement or reduction only in the lateral direction may be performed. Also in that case, the expressions given above are valid because the expressions are definition of only the X axis, that is, the horizontal axis direction. In enlargement or reduction only in the lateral direction, the amount of calculation which is performed for enlargement/reduction processing can be reduced. Furthermore, because the size does not change in the vertical axis direction, a little influence is exerted on size perception.

In the above description, reference positions of left and right images and a reference parallax, which is the distance between the reference positions, are set to any one of the following: edge of screen, fixed depth (far side), fixed depth (near side), automatic acquisition (far side), automatic acquisition (near side), and off for simplicity. Alternatively, the reference positions may be set to other positions.

For example, control for not changing the center position of depth which is expressed in an image can be performed by using an intermediate value between the parallax of the far-end view and the parallax of the nearest view as a reference parallax. Also, a parallax amount can be changed without changing the depth of a displayed object having a large display area on the screen, by using a parallax amount at a point where the emergence frequency of a parallax amount is high as a reference parallax. Also, display can be performed in which the depth of a displayed object whose movement amount of the depth position is small is not changed, by using a parallax amount at a point where change in parallax amount is small as a reference parallax. These processes can be realized with the configurations illustrated in FIGS. 1 and 2, by transmitting a so-called parallax map in which parallaxes of a left-eye image and a right-eye image calculated by the parallax amount calculating unit 1015 are associated with positions in the images to the system control unit 104, and by performing analysis by the system control unit 104.

Also, it is effective to provide an image analyzing unit, acquire a vanishing point from an image, and calculate a reference parallax on the basis of a depth corresponding to the position of the vanishing point. Specifically, straight lines are detected from an image, an intersection of the straight lines is regarded as a vanishing point, and the depth of the vanishing point is set to a parallax of the depth of the allowable backmost surface. Accordingly, an image of natural perspective in which the depth of the vanishing point corresponds to the backmost point can be obtained. Alternatively, with the image analyzing means, a specific pattern in an image, for example, a face image of a person, may be recognized, and the vicinity of the specific pattern may be set as reference points of a left-eye image and right-eye image, or the parallax of the person may be set as a reference parallax. Accordingly, a parallax amount can be adjusted without changing the depth of the person.

In a case where a non-display region is generated around the left-eye image and right-eye image as a result of the above-described parallax adjustment, another image may be displayed in the region. Here, the other image is referred to as a frame image or an image frame. Referring to FIGS. 1 and 2, for example, in the case of displaying an image frame in the non-display region, the viewer operates the user input unit 105 and selects a process of displaying an image frame. In response to the operation of selecting the image frame, the parallax adjusting unit 101 reads out frame image data from the frame image recording unit 1016 provided therein, and transmits the frame image data to the left-eye frame image superimposing unit 1013 and the right-eye frame image superimposing unit 1014. At this time, the frame image data may be two-dimensional data or may be three-dimensional data which enables stereoscopic viewing. The left-eye frame image superimposing unit 1013 and the right-eye frame image superimposing unit 1014 superimpose the frame image data which has been read out from the frame image recording unit 1016 on the non-display regions around the left-eye image and right-eye image which have been reduced by the left-eye enlarging/reducing unit 1011 and the right-eye enlarging/reducing unit 1012.

With this process, a frame image can be added around a reduced stereoscopic image. FIG. 14 is a diagram illustrating an example of the image to which a frame image has been added. When a frame image 203 is added to a stereoscopic image 201, the difference between the depths of the frame image 203 and the stereoscopic image 201 can be relatively grasped, and thus the stereoscopic effect of the stereoscopic image 201 can be easily perceived. The frame image 203 may be selected from among a plurality of candidates. At this time, the frame image 203 may be selected in accordance with the preference of the viewer, or may be displayed using information which has been obtained in the form of metadata from the stereoscopic image. The frame image 203 may be randomly selected, or the frame image 203 having a sense of the season may be selected in accordance with the date and time of the stereoscopic image 201, and accordingly interest can be increased. More preferably, a parallax amount near the frame may be extracted from the parallax information about the stereoscopic image 201, and a frame image may be selected accordingly, so that the difference between relative depths of the frame and image can be easily grasped.

These functions can be realized by transmitting, to the system control unit 104, the parallax amounts calculated by the parallax amount calculating unit 1015 in the form of a parallax map, and by performing a process. Alternatively, the frame image 203 may be selected using brightness information about the stereoscopic image 201. In this case, the brightness of the image is considered, which prevents the frame from becoming conspicuous. This function can be easily realized by adding a brightness information calculation function 1015a to the parallax amount calculating unit 1015.

In addition to or instead of the frame image recording unit 1016, a frame image extracting unit that extracts an image to be used as a frame image from stereoscopic image data may be provided, and a frame image extracted from the stereoscopic image data may be used.

Also, character information superimposition display units 1013a and 1014a that display character information by superimposing it on an image frame may be provided, and character information may be displayed. In this case, a parallax may be given to the frame image and character information, that is, the frame image and character information may be displayed at a depth which is different from the depth of the screen of a display device.

When character information 205 is displayed by being superimposed on the frame image 203, opportunities of looking at the character portion increase, the character portion serves as a reference of parallax, eyestrain is relieved by, for example, reducing a parallax, and stereoscopic viewing of the stereoscopic image 201 can be performed more easily. The character information 205 may be information which is not related to an image, playback time information, or information which is remotely related to the image, and may be displayed as a digital clock or the like. In a case where the character information 205 is information related to an image, for example, captions, the following advantages can be obtained. That is, the time period in which the viewer is looking at the character portion further increases. Also, captions, which are typically displayed on an image and cover the image, can be displayed outside the image, so that covering of the image can be prevented.

In the above description, two images, that is, a right-eye image and a left-eye image, have been described as a stereoscopic image. The images constituting a stereoscopic image are not limited to two images, and image data for multi-viewpoint images may be used. In this case, a process similar to the above-described process is performed on the individual images so that the reference points relatively have the above-described relationship.

As a display system which enables stereoscopic viewing, stereoscopic display means of a time-division scheme using shutter glasses has been described. The stereoscopic display system is not limited to that of the time-division scheme, and the form thereof is not limited as long as the display system is capable of achieving stereoscopic viewing, for example, a display system using a parallax barrier or a display system using a lenticular lens may be adopted. As described above, a display for multi-viewpoint images is also acceptable.

Second Embodiment

Hereinafter, a stereoscopic image display device according to a second embodiment of the present invention will be described with reference to FIG. 15. In the second embodiment, a region 253 for displaying a frame image is provided in advance in an inner periphery portion of a display screen 251.

A region inside the region 253 for displaying a frame image is regarded as a stereoscopic image display region 251, and a stereoscopic image is displayed in the region. Other than this, a hardware configuration and a method for realizing a user interface are similar to those of the first embodiment, and the description thereof is omitted. More specifically, in FIG. 2, a frame image is not superimposed on a stereoscopic image, and a stereoscopic image display unit and a frame image display unit are independent of each other. If the display width of a frame image is changeable, the display area of a stereoscopic image can be adjusted.

Display of a frame image enables a viewer to feel a stereoscopic effect of a stereoscopic image more easily. Also, limiting a display region of a stereoscopic image can limit display magnification, and can reduce a visually induced sickness caused by excessive immersion in large-screen display. For example, a display time of a stereoscopic image is measured, or a parallax amount of a stereoscopic image is considered, and a display region for a stereoscopic image may be reduced over time, or a caption may be displayed after a certain time has elapsed. Causing a viewer to look at display of a caption may allow eyestrain to be alleviated.

Third Embodiment

A stereoscopic image generation device according to a third embodiment of the present invention that adds the above-described reference points and reference coordinates to stereoscopic image data will be described. As described above, a depth position can be easily controlled by controlling a parallax in accordance with reference points and a reference parallax. Also, depth processing in which the intension on a producer side is reflected can be performed by adding reference points and a reference parallax to stereoscopic image data in advance. Referring to FIG. 1, the stereoscopic image processing unit 100 is provided with a stereoscopic information acquiring unit (parallax amount adjustment information acquiring unit) 100a that acquires stereoscopic information added to stereoscopic image data, such as reference points and a reference parallax, from the stereoscopic image data.

Addition of at least one of a reference point and a reference parallax to a still image or moving image and extraction of the reference point or reference parallax on a playback side (stereoscopic image display device) enables the playback side to acquire the reference parallax and to perform parallax adjustment in accordance with a reference depth.

In the case of a moving image, a reference point or reference parallax may be defined for a series of images, or may be defined in units of time sections or with respect to each of still images constituting the moving image. Preferably, a parallax at the farthest point and a parallax at the nearest point may be transmitted together with a reference parallax at the timings at which a scene changes, and accordingly a parallax amount can be naturally collected, and eyestrain of a viewer caused by an excessive parallax or excessive parallax fluctuation can be alleviated. Change of a scene can be detected on a playback side, but it is difficult for the playback side to analyze the parallax amount of the entire scene. Thus, addition of the above-described parameter to image data for each scene is effective for naturally displaying an image. Addition of information about a reference parallax and a content parallax can be realized by giving parallax information to an image encoder, and can be more easily realized by adding the function to image edit software or authoring software in which processing is performed by using a personal computer (PC). As described in the first embodiment, it is more preferable that a frame image be specified or superimposed.

Fourth Embodiment

In the fourth embodiment of the present invention, stereoscopic image processing is performed by using a personal computer (hereinafter referred to as a PC), and stereoscopic display is achieved by using a display device capable of achieving stereoscopic display. With the PC, a user performs stereoscopic image processing by operating a GUI application by using an operation device of the PC, for example, a mouse, keyboard, touch panel, or the like. That is, a CPU provided in the PC executes processing on a moving image or still image in accordance with stereoscopic display application software which is recorded in a storage device, for example, a hard disk or a CD-ROM, and thereby stereoscopic display on the stereoscopic display device is achieved.

FIG. 16 is a diagram describing a display screen of the stereoscopic display device according to the fourth embodiment of the present invention. A screen 303 based on the stereoscopic image display application is displayed on a stereoscopic display device 301. The display includes a stereoscopic image display 303a and a GUI display. The GUI includes operation buttons 305 for playback and so on, a bar 307 indicating a playback position, a depth adjustment tab 311, setting buttons 311a to 311h for adjusting a depth, and a slid bar 315 for adjusting a parallax.

A user is capable of processing the stereoscopic image display 303a by operating the setting buttons 311a to 311h and the slide bar 315 on the GUI by using the operation device, such as a mouse or keyboard. A processing result may be stored in a hard disk or the like, as a new image file or by overwriting it on an existing image file.

By using the above-described stereoscopic display device, the user can perform setting including depth adjustment, and perform customization to achieve the setting suitable for the user.

In the above-described first to fourth embodiments, no particular units are defined for a reference position, a reference parallax, coordinates, and so forth. The units are not specified as long as they are compatible with a processing system. For example, in the block diagram illustrated in FIG. 1, the input unit 10 to the display unit 103 may be constituted in units of pixels, which correspond to dots constituting an image, and the system control unit 104 may convert and process position information of a metric unit input from the user input unit.

In the above-described embodiments, the configuration and so forth illustrated in the attached drawings are not limited thereto, and can be appropriately changed within the scope in which the advantages of the present invention are exerted. Also, the configuration and so forth can be appropriately changed without deviating from the scope of the object of the present invention.

Also, the processing in each unit may be performed by recording a program for realizing the functions described in the embodiments on a computer-readable recording medium, and by allowing a computer system to read the program recorded on the recording medium and execute the program. Here, the "computer system" includes hardware, such as an OS and a peripheral device.

In a case where a WWW system is used, the "computer system" includes a web site providing environment (or display environment).

The "computer-readable recording medium" is a portable medium, such as a flexible disk, a magneto-optical disk, a ROM, or a CD-ROM, or is a storage device, such as a hard disk built in the computer system. Furthermore, the "computer-readable recording medium" includes a medium which dynamically holds a program for a short time, such as a transmission line used for transmitting a program via a network such as the Internet or a communication line such as a telephone line, and a medium which holds a program for a certain time period, such as a volatile memory in a server or a computer system serving as a client in that case. The above-described program may be a program for realizing a part of the above-described functions, and may be a program capable of realizing the above-described functions in combination with a program which is already recorded in the computer system.

INDUSTRIAL APPLICABILITY

The present invention can be utilized for a 3D television receiver or the like.

All the publications, patents, and patent applications cited in this description are incorporated as reference into this description.

REFERENCE SIGNS LIST 10 input unit
100 stereoscopic image processing unit
101 parallax adjusting unit
102 display control unit
103 display unit
104 system control unit
105 user input unit
106 glasses synchronization unit
107 shutter glasses
1011 left-eye enlarging/reducing unit
1012 right-eye enlarging/reducing unit
1013 left-eye frame image superimposing unit
1014 right-eye frame image superimposing unit
1015 parallax amount calculating unit
1016 frame image recording unit
1017 communication/control unit

The invention claimed is:
1. A stereoscopic image generation device that generates a stereoscopic image including a right-eye image and a left-eye image, comprising:

an image enlarging/reducing circuitry that enlarges or reduces the right-eye image and the left-eye image which constitute stereoscopic image data, wherein the image enlarging/reducing circuitry enlarges or reduces the right-eye image and the left-eye image on the basis of parallax amount adjustment information, which includes a position of a right-eye-image reference point and a position of a left-eye-image reference point which are respectively provided at different positions for the right-eye image and the left-eye image, and enlargement ratios of the right-eye image and the left-eye image, with reference to the right-eye-image reference point and the left-eye-image reference point, on the basis of the enlargement ratios, a parallax amount acquiring circuitry that acquires a parallax amount from the stereoscopic image data, wherein the parallax amount adjustment information is set on the basis of a parallax amount which has been acquired by analyzing the stereoscopic image data by the parallax amount acquiring circuitry, wherein the enlargement ratios are set on the basis of a ratio of a difference between a parallax amount which has been acquired by the parallax amount acquiring circuitry and a parallax amount which is associated with a reference position in a depth direction, to a certain parallax amount.

2. The stereoscopic image generation device according to claim 1,
wherein the parallax amount adjustment information is set on the basis of an operation performed by a viewer.

3. The stereoscopic image generation device according to claim 1,
wherein the parallax amount adjustment information is set on the basis of an age of a viewer.

4. A stereoscopic image generation device that generates a stereoscopic image including a right-eye image and a left-eye image, comprising:

an image enlarging/reducing circuitry that enlarges or reduces the right-eye image and the left-eye image which constitute stereoscopic image data, wherein the image enlarging/reducing circuitry enlarges or reduces the right-eye image and the left-eye image on the basis of parallax amount adjustment information, which includes a position of a right-eye-image reference point and a position of a left-eye-image reference point which are respectively provided at different positions for the right-eye image and the left-eye image, and enlargement ratios of the right-eye image and the left-eye image, with reference to the right-eye-image reference point and the left-eye-image reference point, on the basis of the enlargement ratios, wherein the parallax amount adjustment information is manually set with use of a user input unit with which user input is performed, wherein the image enlarging/reducing circuitry provides in advance a region for displaying a frame image, in a screen region outside the stereoscopic image data on the basis of parallax amount setting information which has been set using the user input unit.

5. The stereoscopic image generation device according to claim 4, further comprising:

a frame image recording circuitry to record an image which is to be used as a frame image for superimposing on the left-eye image and right-eye image, a frame image selecting circuitry to select an image which is to be used as a frame image, wherein the frame image selecting circuitry to select the other image from among a plurality of frame images which have been read out from at least one of the frame image recording circuitry and a frame image extracting circuitry.

\* \* \* \* \*